US011333120B2

(12) United States Patent
Lebreux et al.

(10) Patent No.: US 11,333,120 B2
(45) Date of Patent: *May 17, 2022

(54) METHOD FOR OPERATING AN ELECTRIC TURNING MACHINE OPERATIVELY CONNECTED TO AN INTERNAL COMBUSTION ENGINE

(71) Applicant: BOMBARDIER RECREATIONAL PRODUCTS INC., Valcourt (CA)

(72) Inventors: Normand Lebreux, Sherbrooke (CA); Michel Bernier, Sherbrooke (CA); Jasmin Rouleau, Sherbrooke (CA); David Monfette, Linz (AT)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/096,205

(22) Filed: Nov. 12, 2020

(65) Prior Publication Data
US 2021/0062774 A1 Mar. 4, 2021

Related U.S. Application Data

(63) Continuation of application No. 16/253,372, filed on Jan. 22, 2019, now Pat. No. 10,859,052, which is a (Continued)

(51) Int. Cl.
*F02N 11/04* (2006.01)
*F02N 3/02* (2006.01)
(Continued)

(52) U.S. Cl.
CPC ............ *F02N 11/04* (2013.01); *F02D 41/064* (2013.01); *F02N 3/02* (2013.01); *F02N 11/06* (2013.01);
(Continued)

(58) Field of Classification Search
CPC .......................... F02N 11/105; F02N 11/0848
(Continued)

(56) References Cited

U.S. PATENT DOCUMENTS 2,418,560 A * 4/1947 Sikorra ............... H02P 1/20
388/844
2,452,127 A * 10/1948 James ................. H02P 1/20
388/847
(Continued)

FOREIGN PATENT DOCUMENTS

EP    1954940 B1    7/2009
GB    2284662 B  *  4/1998  .......... H01M 10/663
(Continued)

OTHER PUBLICATIONS

Final Office Action dated Jul. 14, 2021 by the USPTO in connection with the US-related U.S. Appl. No. 16/681,433 and including the PTO-892 Form with the references cited by the Examiner.
(Continued)

*Primary Examiner* — Kevin R Steckbauer
(74) *Attorney, Agent, or Firm* — BCF LLP

(57) ABSTRACT

An electric turning machine (ETM) operatively connected to an internal combustion engine (ICE) is operated as a motor with a first control strategy and as a generator with a second control strategy. In the first control strategy, electric power is delivered from a power source to the ETM selectively through at least one transistor of an electrical converter. After switching from the first control strategy to the second control strategy, the ETM delivers electric power to an accessory selectively through the at least one transistor of the electrical converter.

19 Claims, 16 Drawing Sheets

Related U.S. Application Data continuation of application No. 15/775,616, filed as application No. PCT/IB2016/056824 on Nov. 11, 2016, now Pat. No. 10,883,467.

(60) Provisional application No. 62/254,421, filed on Nov. 12, 2015.

(51) Int. Cl.
  *F02N 11/08* (2006.01)
  *F02N 11/06* (2006.01)
  *F02D 41/06* (2006.01)
  *F02N 3/04* (2006.01)
  *F02N 3/00* (2006.01)

(52) U.S. Cl.
  CPC ...... *F02N 11/0803* (2013.01); *F02N 11/0814* (2013.01); *F02N 11/0866* (2013.01); *F02N 3/00* (2013.01); *F02N 3/04* (2013.01); *F02N 2011/0885* (2013.01); *F02N 2011/0888* (2013.01); *F02N 2011/0896* (2013.01); *F02N 2200/022* (2013.01); *F02N 2200/023* (2013.01); *F02N 2200/044* (2013.01); *F02N 2200/046* (2013.01); *F02N 2200/063* (2013.01); *F02N 2200/122* (2013.01)

(58) Field of Classification Search
  USPC .............................................. 290/36 R, 37 A
  See application file for complete search history.

(56) References Cited

U.S. PATENT DOCUMENTS

| | | | | | |
|---|---|---|---|---|---|
| 3,493,776 | A * | 2/1970 | Porter | ............... | H02J 7/14 290/31 |
| 3,728,604 | A * | 4/1973 | Grygera | ............... | H02P 7/293 318/459 |
| 3,908,130 | A * | 9/1975 | Lafuze | ............... | F02N 11/04 290/46 |
| 4,030,878 | A * | 6/1977 | Kunath | ............... | F27B 7/26 432/45 |
| 4,122,354 | A * | 10/1978 | Howland | ............... | F02N 11/04 290/31 |
| 4,219,739 | A * | 8/1980 | Greenwell | ............... | F02N 11/04 290/38 R |
| 4,410,845 | A * | 10/1983 | Lockyear | ............... | E21B 43/128 318/368 |
| 4,459,536 | A * | 7/1984 | Wirtz | ............... | F02N 11/0859 290/46 |
| 4,481,459 | A * | 11/1984 | Mehl | ............... | F02N 11/04 290/38 R |
| 4,626,696 | A * | 12/1986 | Maucher | ............... | B60K 6/48 290/38 R |
| 4,633,154 | A * | 12/1986 | Maeda | ............... | H02P 3/10 318/254.1 |
| 4,720,638 | A * | 1/1988 | Vollbrecht | ............... | F02B 61/045 290/38 R |
| 4,774,915 | A * | 10/1988 | Nguyen | ............... | F02N 11/0851 123/179.3 |
| 4,797,602 | A * | 1/1989 | West | ............... | F02N 11/04 290/46 |
| 4,862,009 | A * | 8/1989 | King | ............... | F02N 11/04 290/22 |
| 4,873,950 | A * | 10/1989 | Furuyama | ............... | F02D 41/064 123/179.3 |
| 4,894,553 | A * | 1/1990 | Kaneyuki | ............... | H02K 29/06 290/31 |
| 4,894,570 | A * | 1/1990 | Kaneyuki | ............... | F02N 15/025 310/113 |
| 4,908,540 | A * | 3/1990 | Motodate | ............... | F02N 11/04 290/46 |
| 4,918,323 | A * | 4/1990 | Aso | ............... | H02K 7/108 290/46 |
| 4,918,343 | A * | 4/1990 | Heinrich | ............... | H02K 1/185 310/113 |
| 4,948,997 | A * | 8/1990 | Ohmitsu | ............... | F02N 11/04 290/38 R |
| 4,959,595 | A * | 9/1990 | Nishimura | ............... | F02N 11/04 290/46 |
| 5,012,177 | A * | 4/1991 | Dhyanchand | ............... | H02P 9/40 290/46 |
| 5,101,780 | A * | 4/1992 | Jones | ............... | F02N 19/00 123/179.17 |
| 5,126,582 | A * | 6/1992 | Sugiyama | ............... | F02N 11/04 290/22 |
| 5,132,604 | A * | 7/1992 | Shimane | ............... | F02N 11/04 290/46 |
| 5,189,355 | A * | 2/1993 | Larkins | ............... | G11B 15/103 318/685 |
| 5,212,952 | A * | 5/1993 | Yokoyama | ............... | F01M 3/00 290/46 |
| 5,219,397 | A * | 6/1993 | Jones | ............... | F02N 19/004 123/179.16 |
| 5,237,230 | A * | 8/1993 | Sugiyama | ............... | F02N 11/04 290/46 |
| 5,254,917 | A * | 10/1993 | Oda | ............... | H02P 7/06 318/446 |
| 5,323,743 | A * | 6/1994 | Kristiansson | ............... | F02N 11/04 123/179.28 |
| 5,458,098 | A * | 10/1995 | Yagi | ............... | F02N 11/08 123/179.3 |
| 5,495,127 | A * | 2/1996 | Aota | ............... | B60W 20/00 290/31 |
| 5,713,320 | A * | 2/1998 | Pfaff | ............... | F02N 11/006 123/179.3 |
| 6,018,199 | A * | 1/2000 | Shiroyama | ............... | B60K 6/485 290/37 A |
| 6,104,157 | A * | 8/2000 | Kramer | ............... | F02N 11/0851 318/430 |
| 6,153,942 | A * | 11/2000 | Roseman | ............... | F02N 11/04 290/31 |
| 6,369,532 | B2 * | 4/2002 | Koenen | ............... | F02N 11/04 180/165 |
| 6,392,311 | B2 * | 5/2002 | Inaba | ............... | F02N 11/04 290/31 |
| 6,453,863 | B1 * | 9/2002 | Pels | ............... | F02N 11/04 123/179.3 |
| 6,526,931 | B1 * | 3/2003 | Vilou | ............... | F02N 11/0825 123/179.4 |
| 6,637,395 | B1 * | 10/2003 | Olson | ............... | F02N 3/04 123/179.3 |
| 6,647,939 | B2 * | 11/2003 | Manabe | ............... | F02N 11/0862 123/179.3 |
| 6,707,169 | B2 * | 3/2004 | Shimizu | ............... | H02P 9/30 290/40 C |
| 6,840,203 | B2 * | 1/2005 | Wakitani | ............... | F02N 11/0848 123/179.25 |
| 6,845,313 | B2 * | 1/2005 | Hasegawa | ............... | F02N 3/04 701/113 |
| 7,061,130 | B1 * | 6/2006 | Blackburn | ............... | F02N 11/04 180/65.22 |
| 7,105,944 | B2 * | 9/2006 | Wakitani | ............... | F02N 11/04 307/10.6 |
| 7,239,032 | B1 * | 7/2007 | Wilson | ............... | F02N 11/04 290/31 |
| 7,261,076 | B2 * | 8/2007 | Hoevermann | ............... | F02D 41/009 123/179.28 |
| 7,400,053 | B2 * | 7/2008 | Wilson | ............... | F02N 11/04 290/31 |
| 7,425,769 | B2 * | 9/2008 | Roh | ............... | F02N 11/04 123/179.3 |
| 7,525,287 | B2 * | 4/2009 | Miyashita | ............... | F02N 11/08 320/134 |
| 7,650,865 | B2 * | 1/2010 | Kohls | ............... | F02N 11/08 123/179.24 |
| 7,737,575 | B2 * | 6/2010 | Yamamoto | ............... | H02J 7/1446 307/9.1 |

(56) References Cited

U.S. PATENT DOCUMENTS

| | | | | |
|---|---|---|---|---|
| 7,760,108 B2* | 7/2010 | McCall | | F02N 11/0807 340/12.15 |
| 7,804,279 B2* | 9/2010 | Becker | | H02P 29/0016 322/29 |
| 7,808,119 B2* | 10/2010 | Becker | | F02D 29/06 290/40 B |
| 7,944,185 B2* | 5/2011 | Jabaji | | F02D 29/06 322/45 |
| 8,143,757 B2* | 3/2012 | Yoshida | | H02K 11/048 310/156.32 |
| 8,154,165 B2* | 4/2012 | Yoshida | | H02K 11/048 310/156.32 |
| 8,171,907 B2* | 5/2012 | Koenen | | F02N 11/0803 123/179.3 |
| 8,198,872 B2* | 6/2012 | Xu | | H02K 19/38 322/59 |
| 8,210,978 B2* | 7/2012 | Shirasaka | | F02N 11/0833 475/129 |
| 8,222,753 B2* | 7/2012 | Yoshida | | F02B 63/04 290/1 A |
| 8,251,035 B2* | 8/2012 | Hirano | | F02N 11/0844 123/179.4 |
| 8,569,903 B2* | 10/2013 | Gibson | | B60L 1/003 290/36 R |
| 8,618,709 B2* | 12/2013 | Inagaki | | H02K 21/14 310/156.57 |
| 8,672,069 B2* | 3/2014 | Cherney | | B60L 50/61 180/65.245 |
| 8,710,685 B2* | 4/2014 | Gibson | | B60L 58/20 290/36 R |
| 8,763,391 B2* | 7/2014 | Kamen | | F02B 75/1896 60/525 |
| 8,833,325 B2* | 9/2014 | Hashimoto | | F02N 11/0855 123/179.4 |
| 8,839,754 B2* | 9/2014 | Bouchon | | B60W 10/08 123/179.3 |
| 8,961,366 B2* | 2/2015 | Furuya | | B60W 20/10 477/8 |
| 9,366,216 B2* | 6/2016 | Be | | F02N 11/0822 |
| 9,422,906 B2* | 8/2016 | Kees | | B60K 6/485 |
| 9,677,527 B2* | 6/2017 | Kees | | F02N 11/0862 |
| 9,726,135 B2* | 8/2017 | Zeiler | | E01H 5/098 |
| 9,764,702 B2* | 9/2017 | Planas | | B60L 58/13 |
| 9,787,235 B2* | 10/2017 | Engber | | H02P 9/00 |
| 9,846,203 B2* | 12/2017 | Saito | | F02N 11/0862 |
| 10,131,298 B2* | 11/2018 | Boucharel | | B60R 16/03 |
| 10,233,889 B2* | 3/2019 | Zeiler | | E01H 5/098 |
| 10,240,552 B2* | 3/2019 | Sekita | | F02N 3/02 |
| 10,288,028 B2* | 5/2019 | Nakaoka | | F02N 11/0825 |
| 10,309,807 B2 | 6/2019 | Qian | | |
| 10,859,052 B2* | 12/2020 | Lebreux | | F02N 3/02 |
| 2002/0017261 A1* | 2/2002 | Kuroda | | F02N 11/0825 123/179.4 |
| 2002/0047419 A1* | 4/2002 | Shimizu | | H02P 9/30 310/120 |
| 2002/0078914 A1* | 6/2002 | Manabe | | F02N 11/0862 123/179.3 |
| 2004/0000281 A1* | 1/2004 | Wakitani | | F02N 11/0848 123/179.3 |
| 2006/0087280 A1* | 4/2006 | Miyashita | | H01M 50/572 320/104 |
| 2006/0214426 A1* | 9/2006 | Asao | | H02P 9/305 290/31 |
| 2007/0069521 A1* | 3/2007 | Jabaji | | F02D 29/06 290/40 C |
| 2007/0228735 A1* | 10/2007 | Becker | | H02P 9/30 290/40 C |
| 2008/0001407 A1* | 1/2008 | Wilson | | F02N 11/04 290/36 R |
| 2008/0157527 A1* | 7/2008 | Jones | | F02N 11/0803 290/34 |
| 2008/0168959 A1* | 7/2008 | Katayama | | F02N 11/0848 123/179.3 |
| 2009/0020091 A1* | 1/2009 | Botzenhard | | F02N 11/0855 123/179.3 |
| 2009/0020092 A1* | 1/2009 | Kishibata | | F02D 41/062 123/179.3 |
| 2009/0061705 A1* | 3/2009 | Wiatrowski | | F02N 11/0862 440/85 |
| 2010/0031911 A1 | 2/2010 | Gessier et al. | | |
| 2010/0096862 A1* | 4/2010 | Jabaji | | F02D 29/06 290/40 B |
| 2010/0108008 A1* | 5/2010 | McCall | | F02N 11/0807 123/179.2 |
| 2010/0167874 A1* | 7/2010 | Shirasaka | | F16H 61/0021 477/86 |
| 2010/0294231 A1* | 11/2010 | Kusel | | F01M 11/02 123/196 R |
| 2011/0227341 A1 | 9/2011 | Rouis | | |
| 2012/0104768 A1* | 5/2012 | Gibson | | B60L 50/50 290/36 R |
| 2012/0216768 A1* | 8/2012 | Nakamura | | F02N 11/0848 123/179.3 |
| 2012/0242265 A1 | 9/2012 | Richter et al. | | |
| 2012/0318227 A1* | 12/2012 | Hashimoto | | F02N 11/0851 123/179.3 |
| 2013/0271051 A1* | 10/2013 | Goto | | B60W 20/00 318/400.26 |
| 2013/0343906 A1* | 12/2013 | Funke | | A01D 34/006 417/10 |
| 2014/0000235 A1* | 1/2014 | Kamen | | F28F 13/06 60/39.6 |
| 2014/0055102 A1* | 2/2014 | Gibson | | B60L 1/003 322/7 |
| 2014/0070545 A1* | 3/2014 | Engber | | F02N 11/04 290/40 R |
| 2014/0081561 A1* | 3/2014 | Be | | F02N 11/0818 701/112 |
| 2014/0287870 A1* | 9/2014 | Furuya | | B60W 20/10 477/5 |
| 2014/0299089 A1* | 10/2014 | Koenen | | F02N 11/14 123/179.28 |
| 2015/0224984 A1* | 8/2015 | Kees | | F02N 11/04 701/22 |
| 2015/0226171 A1* | 8/2015 | Kees | | B60W 30/194 290/31 |
| 2015/0240774 A1* | 8/2015 | Zeiler | | E01H 5/098 37/259 |
| 2015/0336474 A1* | 11/2015 | Okaniwa | | B60L 15/007 307/10.6 |
| 2016/0011275 A1* | 1/2016 | Saito | | G01R 31/389 324/430 |
| 2016/0115933 A1* | 4/2016 | Koenen | | A01D 34/6818 290/38 R |
| 2016/0368437 A1* | 12/2016 | Boucharel | | H02J 7/166 |
| 2017/0253127 A1* | 9/2017 | Ciaccio | | B60L 53/00 |
| 2017/0254310 A1* | 9/2017 | Nakaoka | | F02N 11/101 |
| 2017/0306916 A1* | 10/2017 | Zeiler | | H02J 7/0045 |
| 2018/0087464 A1* | 3/2018 | Sekita | | F02N 11/0862 |
| 2018/0145566 A1* | 5/2018 | Shin | | H02K 11/225 |
| 2018/0347534 A1* | 12/2018 | Lebreux | | F02N 11/0803 |
| 2019/0145368 A1* | 5/2019 | Nakaoka | | F02N 15/04 123/179.3 |
| 2019/0153988 A1* | 5/2019 | Lebreux | | F02N 11/04 |
| 2019/0153989 A1* | 5/2019 | Lebreux | | F02N 3/02 |
| 2019/0153990 A1* | 5/2019 | Lebreux | | F02N 11/0866 |
| 2019/0178220 A1* | 6/2019 | Zeiler | | H02J 7/0045 |
| 2020/0056559 A1 | 2/2020 | Lebreux et al. | | |
| 2020/0080504 A1 | 3/2020 | Lebreux et al. | | |
| 2020/0080505 A1 | 3/2020 | Lebreux et al. | | |
| 2021/0062774 A1* | 3/2021 | Lebreux | | F02N 3/02 |

FOREIGN PATENT DOCUMENTS

| | | |
|---|---|---|
| JP | H02211089 A | 8/1990 |
| RU | 2046989 C1 | 10/1995 |
| RU | 96541 U1 | 8/2010 |

(56) References Cited

FOREIGN PATENT DOCUMENTS

| WO | 2007120271 A2 | 10/2007 | |
|---|---|---|---|
| WO | 2007120271 A3 | 8/2008 | |
| WO | 2013032463 A2 | 3/2013 | |
| WO | 2014054434 A1 | 4/2014 | |
| WO | 2015151032 A1 | 10/2015 | |
| WO | 2016016835 A1 | 2/2016 | |
| WO | 2017081664 A2 | 5/2017 | |
| WO | WO-2019087450 A1 * | 5/2019 | ............ F02D 29/02 |

OTHER PUBLICATIONS

Final Office Action dated Jul. 13, 2021 by the USPTO in connection with the US-related U.S. Appl. No. 16/681,418 and including the PTO-892 Form with the references cited by the Examiner.

Notice of Allowance and Fees Due including Notice of references cited by the Examiner (PTO-892 Form) issued by the USPTO dated Dec. 3, 2020 in connection with US-related U.S. Appl. No. 16/485,852.

Notice of Allowance and Fees Due including Notice of references cited by the Examiner (PTO-892 Form) issued by the USPTO dated Sep. 3, 2020 in connection with the co-pending application No. 15/775,616.

International Search Report of PCT/IB2017/052825; dated Oct. 31, 2017.

International Search Report of PCT/IB2016/056824; dated May 18, 2017.

English translation of abstract of JPH02211089; retrieved from https://worldwide.espacenet.com/ on May 8, 2018.

English translation of abstract of WO2014054434A1; retrieved from https://worldwide.espacenet.com/ on May 8, 2018.

Description and Claims of RU96541U1 and English translation thereof retrieved from http://translationportal.epo.org/ on Feb. 17, 2020.

Office Action issued by the Russian Patent Office dated Dec. 2, 2019 in connection with the corresponding Application No. 2018121135 and including Search Report.

English translation of RU2046989C1 retrieved from http://translationportal.epo.org/ on Jun. 23, 2020.

Grant Decision issued from the ROSPATENT dated Jun. 18, 2020 in connection with the corresponding application No. 2019128654.

Office Action including Notice of references cited by the Examiner (PTO-892 Form) issued in connection with US-related U.S. Appl. No. 16/253,388; dated Apr. 3, 2020.

Office Action dated Jul. 31, 2020 in connection with the co-pending U.S. Appl. No. 16/485,852 and including the PTO-892 Form with new reference cited by the Examiner.

Notice of Allowance issued by the USPTO dated Sep. 3, 2020 in connection with the co-pending U.S. Appl. No. 15/775,616 and including PTO-892 Forms with references cited by the Examiner.

* cited by examiner

METHOD FOR OPERATING AN ELECTRIC TURNING MACHINE OPERATIVELY CONNECTED TO AN INTERNAL COMBUSTION ENGINE

CROSS-REFERENCE

The present application is a continuation of U.S. patent application Ser. No. 16/253,372 filed on Jan. 22, 2019, which is a continuation of U.S. patent application Ser. No. 15/775,616 filed on May 11, 2018, which is a national entry of International Patent Application No. PCT/IB16/56824 filed on Nov. 11, 2016, which claims priority to U.S. Provisional Patent Application No. 62/254,421, filed Nov. 12, 2015, the entirety of each of which is incorporated herein by reference.

FIELD OF TECHNOLOGY

The present technology relates to a method and system for operating an electric turning machine operatively connected to an internal combustion engine.

BACKGROUND

In order to start the internal combustion engine of small vehicles, such as a snowmobile, a recoil starter is sometimes provided. To start the engine, the user pulls on a rope of the recoil starter which causes the crankshaft of the engine to turn. If the crankshaft turns fast enough, the engine can be started. If not, the rope needs to be pulled again until the engine starts.

In order to facilitate the starting of the engine, some vehicles have been provided with an electric starting system. This system consists of an electric motor, known as a starter, which engages and turns a ring gear connected to the crankshaft via a Bendix™ mechanism, when an ignition key is turned or a start button is pushed by the user. The starter turns the crankshaft fast enough to permit the starting of the engine, and once the engine has started, disengages the ring gear and is turned off. The vehicle has a battery to supply electric current to the starter in order to turn the crankshaft.

Although it is very convenient for the user, electric starting systems of the type described above have some drawbacks. The battery, the starter and their associated components add weight to the vehicle. As would be understood, additional weight reduces the fuel efficiency of the vehicle and can affect handling of the vehicle. In the case of snowmobiles, this weight also makes it more difficult for the snowmobile to ride on top of snow. These electric starting systems also require additional assembly steps when manufacturing the vehicle and take up room inside the vehicle.

To recharge the battery and to provide the electric current necessary to operate the various components of the vehicle once the engine has started, an electrical generator is operatively connected to the crankshaft of the engine. As the crankshaft turns the rotor of the electrical generator, the generator generates electricity.

In recent years, some vehicles have been provided with motor-generator units, also called starter-generators, which replace the starter and the electrical generator. The motor-generator is operatively connected to the crankshaft in a manner similar to the aforementioned electrical generator. The motor-generator unit can be used as a starter or as a generator. By applying current to the motor-generator unit, the motor-generator unit operates as a starter and turns the crankshaft to enable starting of the engine. When the motor-generator is operated as a generator, the rotation of the crankshaft causes the motor-generator to generate electricity. As would be understood, the use of such systems addresses some of the deficiencies of starting systems using separate starters and electrical generators.

In order to start the engine, the torque applied to the crankshaft to make it turn has to be sufficiently large to overcome the compression inside the engine's cylinders resulting from the pistons moving up in their respective cylinders as the crankshaft rotates. In order to provide this amount of torque, the motor-generator unit needs to be sufficiently large to properly operate as a starter.

Another problem relates to the control of the motor-generator. When operating as a starter, the motor-generator generally operates at low rotational speeds, sufficient to allow the onset of ignition in the internal combustion engine. This operation requires the provision of a certain voltage to the motor-generator by the electric starting system. When operating as a generator, the motor-generator provides electric power over a wide range of rotational speeds of the internal combustion engine, oftentimes far exceeding the starting rotational speed. Without specific voltage control solutions, the motor-generator operating at high rotational speeds could generate voltages that far exceed the needs of the various components of the vehicle.

There is therefore a need for a method and system for starting an internal combustion engine that address at least some of the above inconveniences.

SUMMARY

It is an object of the present technology to ameliorate at least some of the inconveniences present in the prior art.

The present technology provides a system supporting an electrical start procedure for an internal combustion engine (ICE) and a method for electrical starting the ICE that uses an electric turning machine (ETM) connected to the crankshaft to start the engine. The method permits an electrical start of the engine using a power source that is smaller and lighter than conventional batteries. In order to start the engine, electrical power is delivered from the power source to the ETM in a first control strategy to rotate the crankshaft so that fuel injection and ignition can occur. Once the engine is running, whether it has been started manually by pulling the rope of a recoil starter or using the electrical start procedure, electrical power is delivered from the ETM to an accessory in a second control strategy. For example, the accessory may consist of the power source that may be recharged in view of a future electrical start command. The electrical start procedure can be made to conditional to an initial voltage of the power source being equal to or above a minimum threshold. The first control strategy is tailored to provide sufficient torque to rotate the crankshaft without fully depleting the energy stored in the power source. The second control strategy is tailored so that electrical power is delivered to the accessory, for example to the power source, at a voltage that remains fairly constant for a wide range of rotational speeds of the crankshaft.

The present technology also provides a method for starting an internal combustion engine (ICE) having a crankshaft. The method involves a cold start of the ICE, followed by stopping of the ICE and then by restarting of the ICE using an electric start procedure. The ICE is cold-started using a recoil starter. While the ICE is running, an electric turning machine (ETM) mounted to the crankshaft operates as a generator to charge a power source that is smaller and lighter than conventional batteries. After stopping the ICE, the electric start procedure uses the power source to deliver electrical power to the ETM, which is now operating as a starter.

The present technology further provides a method and a system for an assisted start of the ICE. When the crankshaft is rotated by use of the recoil starter, electric power is delivered from the power source to the ETM to assist starting of the ICE. While the ICE is running, whether it has been started manually by pulling the rope of a recoil starter, using the assisted start procedure to facilitate the task of pulling the rope of the recoil starter, or using the electric start procedure, electrical power is also delivered from the ETM to an accessory. The electric start procedure and the assisted start procedure can be made conditional to an initial voltage of the power source being equal to or above a minimum threshold. The electric start procedure and the assisted start procedure are tailored to provide sufficient torque to rotate the crankshaft without fully depleting the energy stored in the power source. Some implementations may include either the electrical start procedure or the assisted start procedure. Other implementations may include both the electrical start procedure and the assisted start procedure.

According to an aspect of the present technology, there is provided a method for operating an electric turning machine (ETM) operatively connected to an internal combustion engine, the method comprising: operating the ETM as a motor with a first control strategy to increase a rotational speed of the internal combustion engine, operating with the first control strategy comprising delivering electric power from a power source to the ETM selectively through at least one transistor of an electrical converter; switching from the first control strategy to a second control strategy, the second control strategy being distinct from the first control strategy; and in response to switching from the first control strategy to the second control strategy, operating the ETM as a generator with the second control strategy, operating with the second control strategy comprising delivering electric power from the ETM to an accessory selectively through the at least one transistor of the electrical converter.

In some implementations of the present technology, the method further comprises switching from the first control strategy to the second control strategy in response to a voltage of the ETM being equal to or above a voltage generation threshold.

In some implementations of the present technology, the method further comprises switching from the first control strategy to the second control strategy in response to the ETM operating with the first control strategy for at least a minimum time duration.

In some implementations of the present technology, the method further comprises operating the ETM as the generator in the first control strategy before switching from the first control strategy to the second control strategy.

In some implementations of the present technology, the ETM operates as a starter for the internal combustion engine while controlling the ETM with the first control strategy.

In some implementations of the present technology, pulse-width modulation (PWM) is used to control the electrical converter connected between the ETM and the power source, the first control strategy including first calculations to determine first widths and first timings of pulses delivered to the electrical converter, the second control strategy including second calculations different from the first calculations to determine second widths and second timings of pulses delivered to the electrical converter.

In some implementations of the present technology, the first control strategy comprises a vector control, the vector control comprising: controlling a delivery of electric power from the power source to the ETM based on a pre-determined torque request sufficient to cause rotation of a crankshaft of the internal combustion engine.

In some implementations of the present technology, the first control strategy comprises a vector control, the vector control comprising: determining a speed request sufficient to start the internal combustion engine; and controlling a delivery of electric power from the power source to the ETM based on the determined speed request.

In some implementations of the present technology, operating the ETM as the generator comprises shunting an output of the ETM in response to the ETM generating a voltage that exceeds a maximum voltage threshold.

In some implementations of the present technology, operating with the second control strategy comprises delivering electric power from the ETM to the accessory at a desired voltage over a range of rotational speeds of the internal combustion engine, the range of rotational speeds being greater than a minimum revolution threshold corresponding to a successful start of the internal combustion engine.

In some implementations of the present technology, the power source is selected from a battery and a capacitance.

In some implementations of the present technology, the accessory is the power source; and operating under the second control strategy comprises operating the ETM as the generator to charge the power source.

In some implementations of the present technology, the method further comprises delivering electric power to the ETM using the first control strategy in response to sensing a command to start the internal combustion engine.

In some implementations of the present technology, electric power is delivered using the first control strategy in response to a voltage of the power source being equal to or above a first minimum voltage threshold.

In some implementations of the present technology, the method further comprises terminating the delivery of electric power in response to the voltage of the power source falling below a second minimum voltage threshold lower than the first minimum voltage threshold; and providing a manual start indication in response to terminating the delivery of electric power.

In some implementations of the present technology, the method further comprises sensing a command to start the internal combustion engine; and in response to sensing the command to start the internal combustion engine, providing a manual start indication in response to a voltage of the power source being below a first minimum voltage threshold.

In some implementations of the present technology, the internal combustion engine comprises: a cylinder; a cylinder head connected to the cylinder; a piston disposed in the cylinder, the cylinder, the cylinder head and the piston defining a variable volume combustion chamber therebetween; and a crankshaft operatively connected to the piston; the ETM being operatively connected to the crankshaft.

In some implementations of the present technology, the method further comprises delivering fuel in the combustion chamber as the piston moves toward its top dead center (TDC) position and igniting the fuel in the combustion chamber as the piston moves beyond its TDC position; delivering the fuel in the combustion chamber comprising injecting the fuel in the combustion chamber.

In some implementations of the present technology, the method further comprises determining the rotational speed of the internal combustion engine.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The method and system for starting an internal combustion engine (ICE) and the method and system for an assisted start of the ICE will be described with respect to a snowmobile 10. However, it is contemplated that the method and system could be used in other vehicles, such as, but not limited to, on-road vehicles, off-road vehicles, a motorcycle, a scooter, a three-wheel road vehicle, a boat powered by an outboard engine or an inboard engine, and an all-terrain vehicle (ATV). It is also contemplated that the method and system could be used in devices other than vehicles that have an internal combustion engine such as a generator. The method and system will also be described with respect to a two-stroke, inline, two-cylinder internal combustion engine (ICE) 24. However, it is contemplated that the method and system could be used with an internal combustion engine having one or more cylinders and, in the case of multi-cylinder engines, having an inline or other configuration, such as a V-type engine as well as 4-stroke engines.

Vehicle

Figure 1:
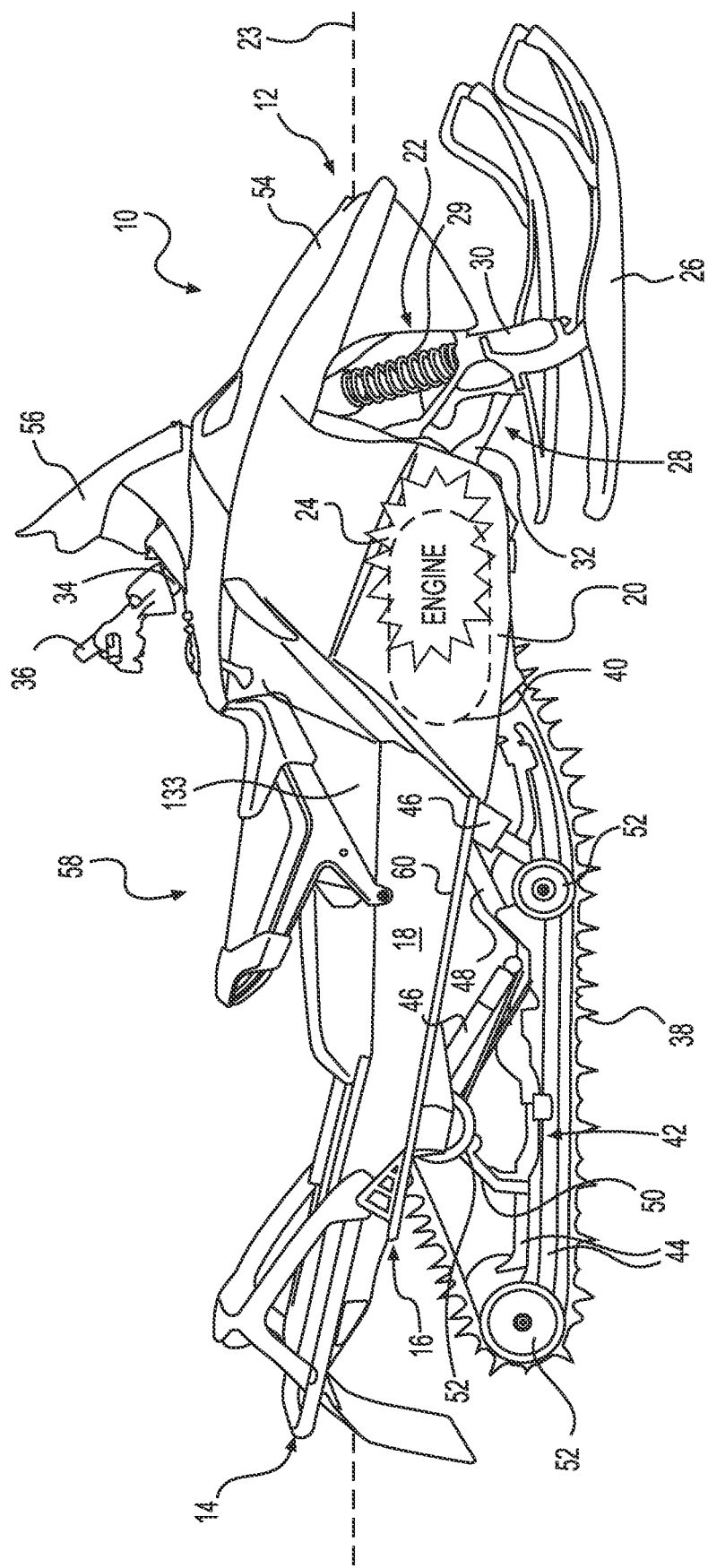
FIG. 1 is a right side perspective view of a snowmobile.

Turning now to FIG. 1, a snowmobile 10 includes a forward end 12 and a rearward end 14 that are defined consistently with a forward travel direction of the snowmobile 10. The snowmobile 10 includes a frame 16 that has a tunnel 18, an engine cradle portion 20 and a front suspension assembly portion 22. The tunnel 18 consists of one or more pieces of sheet metal arranged to form an inverted U-shape that is connected at the front to the engine cradle portion 20 and extends rearward therefrom along the longitudinal axis 23. An ICE 24 (schematically illustrated in FIG. 1) is carried by the engine cradle portion 20 of the frame 16. The ICE 24 is described in greater detail below. Two skis 26 are positioned at the forward end 12 of the snowmobile 10 and are attached to the front suspension assembly portion 22 of the frame 16 through a front suspension assembly 28. The front suspension assembly 28 includes shock absorber assemblies 29, ski legs 30, and supporting arms 32. Ball joints and steering rods (not shown) operatively connect the skis 26 to a steering column 34. A steering device in the form of handlebar 36 is attached to the upper end of the steering column 34 to allow a driver to rotate the ski legs 30 and thus the skis 26, in order to steer the snowmobile 10.

An endless drive track 38 is disposed generally under the tunnel 18 and is operatively connected to the ICE 24 through a CVT 40 (schematically illustrated by broken lines in FIG. 1) which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding one or more of the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the ICE 24 and the CVT 40, thereby providing an external shell that protects the ICE 24 and the CVT 40. The fairings 54 include a hood and one or more side panels that can be opened to allow access to the ICE 24 and the CVT 40 when this is required, for example, for inspection or maintenance of the ICE 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward.

A straddle-type seat 58 is positioned over the tunnel 18. Two footrests 60 are positioned on opposite sides of the snowmobile 10 below the seat 58 to accommodate the driver's feet.

Internal Combustion Engine

Turning now to FIGS. 2 to 5, the ICE 24 and the CVT 40 will be described. The ICE 24 operates on the two-stroke principle. The ICE 24 has a crankshaft 100 that rotates about a horizontally disposed axis that extends generally transversely to the longitudinal axis 23 of the snowmobile 10.

The crankshaft drives the CVT 40 for transmitting torque to the endless drive track 38 for propulsion of the snowmobile 10.

The CVT 40 includes a drive pulley 62 coupled to the crankshaft 100 to rotate with the crankshaft 100 and a driven pulley (not shown) coupled to one end of a transversely mounted jackshaft (not shown) that is supported on the frame 16 through bearings. The opposite end of the transversely mounted jackshaft is connected to the input member of a reduction drive (not shown) and the output member of the reduction drive is connected to a drive axle (not shown) carrying sprocket wheels (not shown) that form a driving connection with the drive track 38.

The drive pulley 62 of the CVT 40 includes a pair of opposed frustoconical belt drive sheaves 64 and 66 between which a drive belt (not shown) is located. The drive belt is made of rubber, but it is contemplated that it could be made of metal linkages or of a polymer. The drive pulley 62 will be described in greater detail below. The driven pulley includes a pair of frustoconical belt drive sheaves between which the drive belt is located. The drive belt is looped around both the drive pulley 62 and the driven pulley. The torque being transmitted to the driven pulley provides the necessary clamping force on the drive belt through its torque sensitive mechanical device in order to efficiently transfer torque to the other powertrain components.

Figure 5:
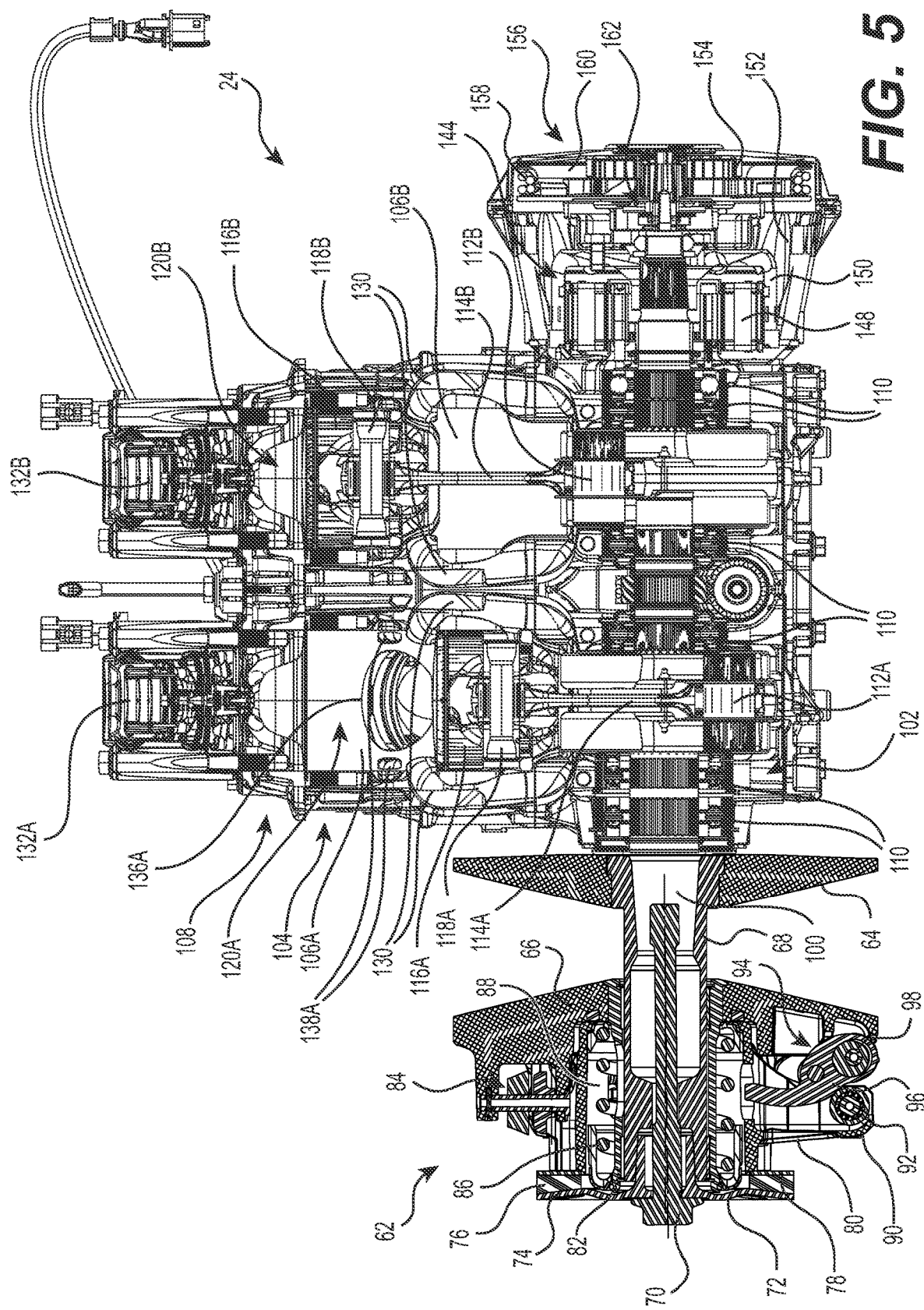
FIG. 5 is a cross-sectional view of the engine of FIG. 2 taken through line 5-5 of FIG. 4 with a drive pulley of a CVT mounted on a crankshaft of the engine.

As discussed above, the drive pulley 62 includes a pair of opposed frustoconical belt drive sheaves 64 and 66 as can be seen in FIG. 5. Both sheaves 64 and 66 rotate together with the crankshaft 100. The sheave 64 is fixed in an axial direction relative to the crankshaft 100, and is therefore referred to as the fixed sheave 64. The fixed sheave 64 is also rotationally fixed relative to the crankshaft 100. The sheave 66 can move toward or away from the fixed sheave 64 in the axial direction of the crankshaft 100 in order to change the drive ratio of the CVT 40, and is therefore referred to as the movable sheave 66. As can be seen in FIG. 5, the fixed sheave 64 is disposed between the movable sheave 66 and the ICE 24.

The fixed sheave 64 is mounted on a fixed sheave shaft 68. The fixed sheave 64 is press-fitted on the fixed sheave shaft 68 such that the fixed sheave 64 rotates with the fixed sheave shaft 68. It is contemplated that the fixed sheave 64 could be connected to the fixed sheave shaft 68 in other known manners to make the fixed sheave 64 rotationally and axially fixed relative to the fixed sheave shaft 68. As can be seen in FIG. 5, the fixed sheave shaft 68 is hollow and has a tapered hollow portion. The tapered hollow portion receives the end of the crankshaft 100 therein to transmit torque from the ICE 24 to the drive pulley 62. A fastener 70 is inserted in the outer end (i.e. the left side with respect to FIG. 5) of the drive pulley 62, inside the fixed sheave shaft 68, and screwed into the end of the crankshaft 100 to prevent axial displacement of the fixed sheave shaft 68 relative to the crankshaft 100. It is contemplated that the fixed sheave shaft 68 could be connected to the crankshaft 100 in other known manners to make the fixed sheave shaft 68 rotationally and axially fixed relative to the crankshaft 100. It is also contemplated that the crankshaft 100 could be the fixed sheave shaft 68.

A cap 72 is taper-fitted in the outer end of the fixed sheave shaft 68. The fastener 70 is also inserted through the cap 72 to connect the cap 72 to the fixed sheave shaft 68. It is contemplated that the cap 72 could be connected to the fixed sheave shaft 68 by other means. The radially outer portion of the cap 72 forms a ring 74. An annular rubber damper 76 is connected to the ring 74. Another ring 78 is connected to the rubber damper 76 such that the rubber damper 76 is disposed between the rings 74, 78. In the present implementation, the rubber damper 76 is vulcanized to the rings 74, 78, but it is contemplated that they could be connected to each other by other means such as by using an adhesive for example. It is also contemplated that the damper 76 could be made of a material other than rubber.

A spider 80 is disposed around the fixed sheave shaft 68 and axially between the ring 78 and the movable sheave 66. The spider 80 is axially fixed relative to the fixed sheave 64. Apertures (not shown) are formed in the ring 74, the damper 76, and the ring 78. Fasteners (not shown) are inserted through the apertures in the ring 74, the damper 76, the ring 78 and the spider 80 to fasten the ring 78 to the spider 80. As a result, torque is transferred between the fixed sheave shaft 68 and the spider 80 via the cap 72, the rubber damper 76 and the ring 78. The damper 76 dampens the torque variations from the fixed sheave shaft 68 resulting from the combustion events in the ICE 24. The spider 80 therefore rotates with the fixed sheave shaft 68.

A movable sheave shaft 82 is disposed around the fixed sheave shaft 68. The movable sheave 66 is press-fitted on the movable sheave shaft 82 such that the movable sheave 66 rotates and moves axially with the movable sheave shaft 82. It is contemplated that the movable sheave 66 could be connected to the movable sheave shaft 82 in other known manners to make the movable sheave 66 rotationally and axially fixed relative to the shaft 82. It is also contemplated that the movable sheave 66 and the movable sheave shaft 82 could be integrally formed.

To transmit torque from the spider 80 to the movable sheave 104, a torque transfer assembly consisting of three roller assemblies 84 connected to the movable sheave 66 is provided. The roller assemblies 84 engage the spider 80 so as to permit low friction axial displacement of the movable sheave 66 relative to the spider 80 and to eliminate, or at least minimize, rotation of the movable sheave 66 relative to the spider 80. As described above, torque is transferred from the fixed sheave 64 to the spider 80 via the damper 76. The spider 80 engages the roller assemblies 84 which transfer the torque to the movable sheave 66 with no, or very little, backlash. As such, the spider 80 is considered to be rotationally fixed relative to the movable sheave 66. It is contemplated that in some implementations, the torque transfer assembly could have more or less than three roller assemblies 84.

As can be seen in FIG. 5, a biasing member in the form of a coil spring 86 is disposed inside a cavity 88 defined radially between the movable sheave shaft 82 and the spider 80. As the movable sheave 66 and the movable sheave shaft 82 move axially toward the fixed sheave 64, the spring 86 gets compressed. The spring 86 biases the movable sheave 66 and the movable sheave shaft 82 away from the fixed sheave 64 toward their position shown in FIG. 5. It is contemplated that, in some implementations, the movable sheave 66 could be biased away from the fixed sheave 64 by mechanisms other than the spring 86.

The spider 80 has three arms 90 disposed at 120 degrees from each other. Three rollers 92 are rotatably connected to the three arms 90 of the spider 80. Three centrifugal actuators 94 are pivotally connected to three brackets (not shown) formed by the movable sheave 66. Each roller 92 is aligned with a corresponding one of the centrifugal actuators 94. Since the spider 80 and the movable sheave 66 are rotationally fixed relative to each other, the rollers 92 remain aligned with their corresponding centrifugal actuators 94 when the shafts 68, 82 rotate. The centrifugal actuators 94 are disposed at 120 degrees from each other. The centrifugal actuators 94 and the roller assemblies 84 are arranged in an alternating arrangement and are disposed at 60 degrees from each other. It is contemplated that the rollers 92 could be pivotally connected to the brackets of the movable sheave 66 and that the centrifugal actuators 94 could be connected to the arms 90 of the spider 80. It is also contemplated that there could be more or less than three centrifugal actuators 94, in which case there would be a corresponding number of arms 90, rollers 92 and brackets of the movable sheave. It is also contemplated that the rollers 92 could be omitted and replaced with surfaces against which the centrifugal actuators 94 can slide as they pivot.

In the present implementation, each centrifugal actuator 94 includes an arm 96 that pivots about an axle 98 connected to its respective bracket of the movable sheave 66. The position of the arms 96 relative to their axles 98 can be adjusted. It is contemplated that the position of the arms 96 relative to their axles 98 could not be adjustable. Additional detail regarding centrifugal actuators of the type of the centrifugal actuator 94 can be found in International Patent Publication No. WO2013/032463 A2, published Mar. 7, 2013, the entirety of which is incorporated herein by reference.

The above description of the drive pulley 62 corresponds to one contemplated implementation of a drive pulley that can be used with the ICE 24. Additional detail regarding drive pulleys of the type of the drive pulley 62 can be found in International Patent Publication No. WO 2015/151032 A1, published on Oct. 8, 2015, the entirety of which is incorporated herein by reference. It is contemplated that other types of drive pulleys could be used.

Figure 2:
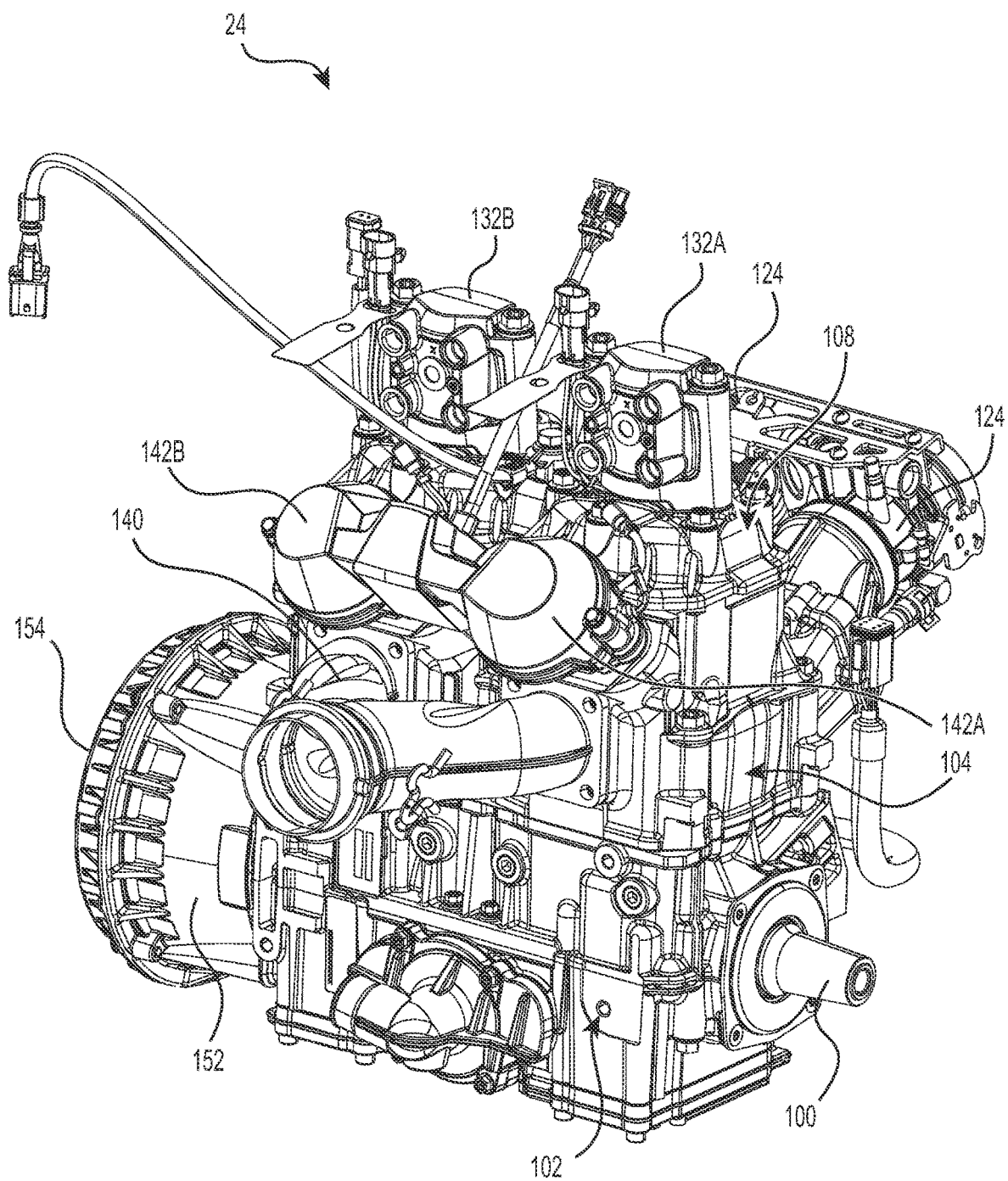
FIG. 2 is a perspective view taken from a front, left side of the internal combustion engine of the snowmobile of FIG. 1.
Figure 3:
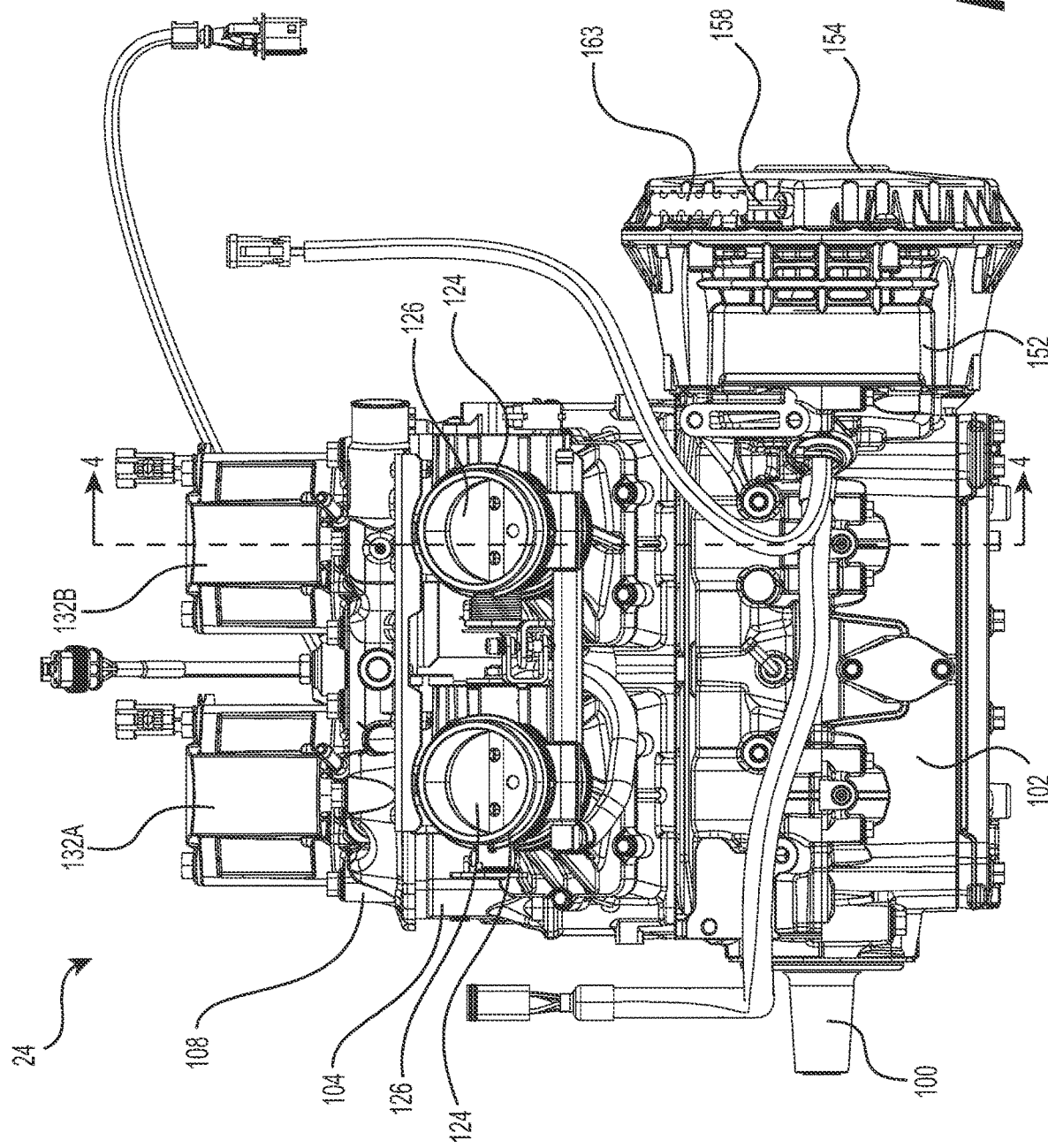
FIG. 3 is a rear elevation view of the engine of FIG. 2.

The ICE 24 has a crankcase 102 housing a portion of the crankshaft 100. As can be seen in FIGS. 2, 3 and 5, the crankshaft 100 protrudes from the crankcase 102. It is contemplated that the crankshaft 100 could drive an output shaft connected directly to the end of the crankshaft 100 or offset from the crankshaft 100 and driven by driving means such as gears in order to drive the drive pulley 62. It is also contemplated that the crankshaft 100 could drive, using gears for example, a counterbalance shaft housed in part in the crankcase 102 and that the drive pulley 62 could be connected to the counterbalance shaft, in which case, the crankshaft 100 does not have to protrude from the crankcase 102 for this purpose. A cylinder block 104 is disposed on top of and connected to the crankcase 102. The cylinder block 104 as shown defines two cylinders 106A, 106B (FIG. 5). A cylinder head 108 is disposed on top of and is connected to the cylinder block 104.

As best seen in FIG. 5, the crankshaft 100 is supported in the crankcase 102 by bearings 110. The crankshaft 100 has two crank pins 112A, 112B. In the illustrated implementation where the two cylinders 106A, 106B are disposed in line, the crank pins 112A, 112B are provided at 180 degrees from each other. It is contemplated that the crank pins 112A, 112B could be provided at other angles from each other to account for other cylinder arrangements, such as in a V-type engine. A connecting rod 114A is connected to the crank pin 112A at one end and to a piston 116A via a piston pin 118A at the other end. As can be seen, the piston 116A is disposed in the cylinder 106A. Similarly, a connecting rod 114B is connected to the crank pin 112B at one end and to a piston 116B via a piston pin 118B at the other end. As can be seen, the piston 116B is disposed in the cylinder 106B. Rotation of the crankshaft 100 causes the pistons 116A, 116B to reciprocate inside their respective cylinders 106A, 106B. The cylinder head 108, the cylinder 106A and the piston 116A define a variable volume combustion chamber 120A therebetween. Similarly, the cylinder head 108, the cylinder 106B and the piston 116B define a variable volume combustion chamber 120B therebetween. It is contemplated that the cylinder block 104 could define more than two cylinders 106, in which case the ICE 24 would be provided with a corresponding number of pistons 116 and connecting rods 114.

Figure 4:
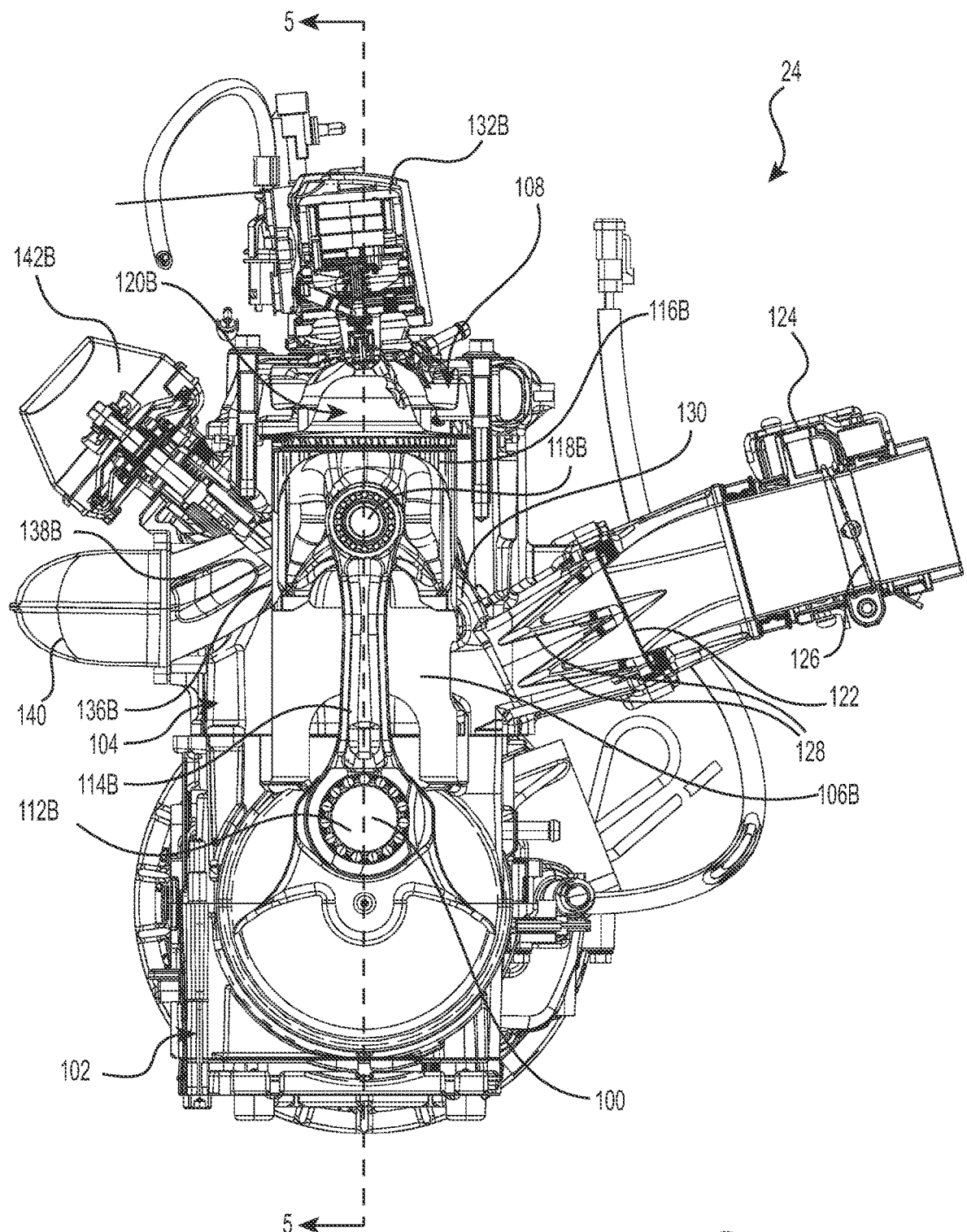
FIG. 4 is a cross-sectional view of the engine of FIG. 2 taken through line 4-4 of FIG. 3.

Air is supplied to the crankcase 102 via a pair of air intake ports 122 (only one of which is shown in FIG. 4) formed in the back of the cylinder block 104. A pair of throttle bodies 124 is connected to the pair of air intake ports 122. Each throttle body 124 has a throttle plate 126 that can be rotated to control the air flow to the ICE 24. Motors (not shown) are used to change the position of the throttle plates 126, but it is contemplated that throttle cables connected to a throttle lever could be used. It is also contemplated that a single motor could be used to change the position of both throttle plates 126. A pair of reed valves 128 (FIG. 4) are provided in each intake port 122. The reed valves 128 allow air to enter the crankcase 102, but prevent air from flowing out of the crankcase 102 via the air intake ports 122.

As the pistons 116A, 116B reciprocate, air from the crankcase 102 flows into the combustion chambers 120A, 120B via scavenge ports 130. Fuel is injected in the combustion chambers 120A, 120B by fuel injectors 132$a$, 132$b$ respectively. The fuel injectors 132$a$, 132$b$ are mounted to the cylinder head 108. The fuel injectors 132$a$, 132$b$ are connected by fuel lines and/or rails (not shown) to one or more fuel pumps (not shown) that pump fuel from a fuel tank 133 (FIG. 1) of the snowmobile 10. In the illustrated implementation, the fuel injectors 132$a$, 132$b$ are E-TECT™ direct fuel injectors, however other types of injectors are contemplated. The fuel-air mixture in the combustion chamber 120A, 120B is ignited by spark plugs 134$a$, 134$b$ respectively (not shown in FIGS. 2 to 5, but schematically illustrated in FIG. 6). The spark plugs 134$a$, 134$b$ are mounted to the cylinder head 108.

To evacuate the exhaust gases resulting from the combustion of the fuel-air mixture in the combustion chambers 120A, 120B, each cylinder 116A, 116B defines one main exhaust port 136A, 136B respectively and two auxiliary exhaust ports 138A, 138B respectively. It is contemplated that each cylinder 116A, 116B could have only one, two or more than three exhaust ports. The exhaust ports 136A, 136B (FIG. 4), 138A, 138B are connected to an exhaust manifold 140. The exhaust manifold is connected to the front of the cylinder block 104. Exhaust valves 142A, 142B mounted to the cylinder block 104, control a degree of opening of the exhaust ports 136A, 136B, 138A, 138B. In the present implementation, the exhaust valves 142A, 142B are R.A.V.E.™ exhaust valves, but other types of valves are contemplated. It is also contemplated that the exhaust valves 142A, 142B could be omitted.

An electric turning machine (ETM) is connected to the end of the crankshaft 100 opposite the end of the crankshaft 100 that is connected to the drive pulley 62. In the present implementation, the ETM is a motor-generator 144 (FIG. 5), and more specifically a three-phase alternating current motor-generator 144, such as a permanent magnet motor for example. It is contemplated that the motor-generator may include a number of pole pairs, generating electric power cycling at a rate that is a multiple of the rotational speed of the crankshaft 100. It is further contemplated that other types of motor-generators could be used, including for example multi-phase motor-generators or poly-phase motor-generators. It is also contemplated that the motor-generator 144 could be connected to another shaft operatively connected to the crankshaft 100, by gears or belts for example. The motor-generator 144, as its name suggests, can act as a motor or as a generator and can be switched between either functions. Under certain conditions as described hereinbelow, the motor-generator 144 is operated in motor operating mode, being powered either by a small battery (not shown) or by a capacitance 145 (shown on FIG. 6).

A battery that is smaller and lighter than one conventionally used for cold starting of the ICE 24 may be used for an electric start procedure and/or for an assisted start procedure that will be described hereinbelow. Alternatively, the electric start procedure and/or the assisted start procedure may rely on the use of a capacitance 145. Non-limiting examples of capacitances include a high-capacity capacitor, an ultracapacitor (U-CAP), an electric double layer capacitor and a supercapacitor Either the small battery or the capacitance 145 supplies electric power to the motor-generator 144 for turning the crankshaft 100. The capacitance 145 can accumulate relatively large amounts of energy. In at least one implementation, the capacitance 145 comprises a plurality of capacitors assembled in series, each capacitor of the series possibly including several capacitors mounted in parallel so that the capacitance 145 can withstand voltages generally within an operating voltage range of direct fuel injectors. In the context of the present disclosure, references are made to the capacitance 145 as a single unit. Without limitation and for brevity, implementations in which the electric start procedure or the assisted start procedure, or both, are implemented using the capacitance 145 along with the motor-generator 144 will be described hereinbelow.

When operating as a generator, the motor-generator 144 is turned by the crankshaft 100 and generates electricity that is supplied to the capacitance 145 and to other electrical components of the ICE 24 and the snowmobile 10. Electric power is exchanged between the capacitance 145 and the motor-generator 144 through an electrical converter. In implementations in which the motor-generator 144 is a three-phase motor, the electrical converter is a three-phase inverter 146. Use of multi-phase or poly-phase inverters in cooperation with a multi-phase or a poly-phase motor-generator is also contemplated. Control strategies of the motor-generator 144 applicable to its motoring and generating functions and the impact of these strategies on the capacitance 145 and on the inverter 146 are described hereinbelow.

As can be seen in FIG. 5, the motor-generator 144 has a stator 148 and a rotor 150. The stator 148 is disposed around the crankshaft 100 outside of the crankcase 102 and is fastened to the crankcase 102. The rotor 150 is connected by splines to the end of the crankshaft 100 and partially houses the stator 148. A housing 152 is disposed over the motor-generator 144 and is connected to the crankcase 102. A cover 154 is connected to the end of the housing 152.

Three starting procedures of the snowmobile 10 may be available to the user. A first procedure comprises a manual start procedure that relies on the use of a recoil starter 156. A second starting procedure comprises an electric start procedure. A third starting procedure comprises an assisted start procedure. One or both of the electric and assisted start procedures may be present in any implementation of the snowmobile 10. The second and third starting procedures will be describer further below. As can be seen in FIG. 5, the recoil starter 156 is disposed inside the space defined by the housing 152 and the cover 154, between the cover 154 and the motor-generator 144. The recoil starter 156 has a rope 158 wound around a reel 160. A ratcheting mechanism 162 selectively connects the reel 160 to the rotor 150. To start the ICE 24 using the recoil starter 156 in the manual start procedure, a user pulls on a handle 163 (FIG. 3) connected to the end of the rope 158. This turns the reel 160 in a direction that causes the ratcheting mechanism 162 to lock, thereby turning the rotor 150 and the crankshaft 100. The rotation of the crankshaft 100 causes the pistons 116A, 116B to reciprocate which permits fuel injection and ignition to occur, thereby starting the ICE 24. When the ICE 24 starts, the rotation of the crankshaft 100 relative to the reel 160 disengages the ratcheting mechanism 162, and as such the crankshaft 100 does not turn the reel 160. When the user releases the handle, a spring (not shown) turns the reel 160 thereby winding the rope 158 around the reel 160.

In the present implementation, the drive pulley 62 and the motor-generator 144 are both mounted to the crankshaft 100. It is contemplated that the drive pulley 62 and the motor-generator 144 could both be mounted to a shaft other than the crankshaft 100, such as a counterbalance shaft for example. In the present implementation, the drive pulley 62, the motor-generator 144 and the recoil starter 56 are all coaxial with and rotate about the axis of rotation of the crankshaft 100. It is contemplated that the drive pulley 62, the motor-generator 144 and the recoil starter 56 could all be coaxial with and rotate about the axis of rotation of a shaft other than the crankshaft 100, such as a counterbalance shaft for example. It is also contemplated that at least one of the drive pulley 62, the motor-generator 144 and the recoil starter 56 could rotate about a different axis. In the present implementation, the drive pulley 62 is disposed on one side of the ICE 24 and the motor-generator 144 and the recoil starter 56 are both disposed on the other side of the ICE 24. It is contemplated the motor generator and/or the recoil starter 56 could be disposed on the same side of the ICE 24 as the drive pulley 62.

Control System for the Internal Combustion Engine

Figure 6:
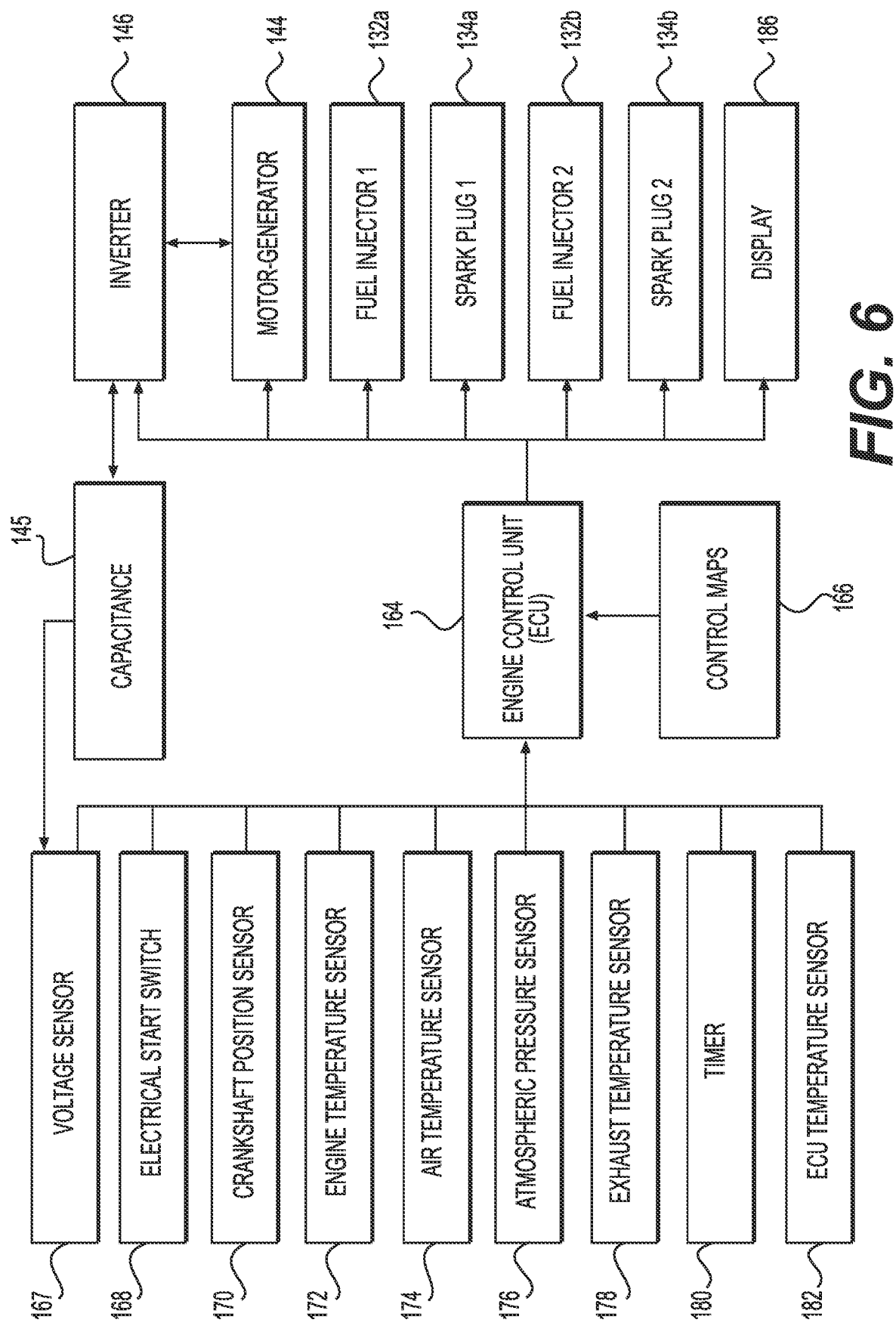
FIG. 6 is a schematic diagram of components of a control system of the engine of FIG. 2.

Available starting procedures of the snowmobile 10 comprise an electric start procedure, an assisted start procedure and a manual start procedure. FIG. 6 is a schematic diagram of components of a control system of the engine of FIG. 2. The control of the components used to start the ICE 24 in the electric start procedure and in the assisted start procedure is done by an engine control unit (ECU) 164 as will be explained below. The ECU 164 is also used to control the operation of the ICE 24 after it has started. The ECU 164 is illustrated as a single physical module (later shown in FIG. 14) comprising a single processor (also in FIG. 14), for example a single microcontroller. Other configurations are within the scope of the present disclosure. For instance, it is contemplated that features of the ECU 164 may be implemented using a plurality of co-processors, for example two or more microcontrollers. It is also contemplated that the various tasks of the ECU 164 could be split between two or more microprocessors integrated in a single electronic module or two or more microprocessors distributed among various electronic modules. As a non-limitative example, the single electronic module may comprise a first processor adapted for controlling a delivery of electric power from the motor-generator 144 to the capacitance 145 and to control the delivery of electric power from the capacitance 145 to the motor-generator 144, and a second processor adapted for controlling a fuel injection function and an ignition function of the ICE. To initiate an electric start procedure or an assisted start procedure of the ICE 24, the ECU 164 receives inputs from the components disposed to the left of the ECU 164 in FIG. 6, some of which are optional and not present in all implementations, as will be described below. Using these inputs, the ECU 164 obtains information from control maps 166 as to how the components disposed to the right of the ECU 164 in FIG. 6 should be controlled in order to start the ICE 24. The control maps 166 are stored in an electronic data storage device, such as a static random access memory (SRAM), an electrically-erasable programmable read-only memory (EEPROM) or a flash drive. It is contemplated that instead of or in addition to the control maps 166, the ECU 164 could use control algorithms to control the components disposed to the right of the ECU 164 in FIG. 6. In the present implementation, the ECU 164 is connected with the various components illustrated in FIG. 6 via wired connections; however it is contemplated that it could be connected to one or more of these components wirelessly.

A user actionable electric start switch 168, provided on the snowmobile 10, for example a push button mounted on or near the handlebar 36, sends a signal to the ECU 164 that the user desires the ICE 24 to start when it is actuated. The electric start switch 168 can also be a switch actuated by a key, a sensor, or any other type of device through which the user can provide an input to the ECU 164 that the ICE 24 is to be started. In at least one implementation, the electric start switch 168 may be a sensor operably connected to the rope 158 of the recoil starter 156 and to the ECU 164. Some traction, for example a simple tugging on the rope 158 by an operator, may be detected by this sensor, resulting in the initiation of the electric start procedure of the ICE 24, provided that all conditions for the electric start procedure are present.

A crankshaft position sensor 170 is disposed in the vicinity of the crankshaft 100 in order to sense the position of the crankshaft 100. The crankshaft position sensor 170 sends a signal representative of the position of the crankshaft 100 to the ECU 164. In the present implementation, the crankshaft position sensor 170 is an absolute position sensor, such as a sin/cos Hall Effect encoder for example. Based on the change in the signal received from the crankshaft position sensor 170, the ECU 164 is also able to determine an angular position of the crankshaft 100. It is contemplated that the crankshaft position sensor 170 could alternatively sense the position of an element other than the crankshaft 100 that turns with the crankshaft 100, such as the rotor 150 of the motor-generator 144 for example, and be able to determine the position of the crankshaft 100 from the position of this element. Use of a relative position sensor to sense the position of the crankshaft 100 is also contemplated as expressed hereinbelow.

The assisted start procedure may be initiated, provided that conditions are met as described hereinbelow, when a rotation of the crankshaft 100 is initiated by the user pulling on the rope 158 of the recoil starter 156. The crankshaft position sensor 170 informs the ECU 170 of the rotation of the crankshaft 100.

A voltage sensor 167, for example a voltmeter, provides a measurement of a voltage of the capacitance 145 to the ECU 164. As explained in more details hereinbelow, the ECU 164 uses this voltage measurement to determine whether an energy reserve of the capacitance 145 is sufficient to start the ICE 24 using the electric start procedure or to provide assist using the assisted start procedure.

Optionally, other sensors can be used to determine whether or not the engine can be started using the electric start procedure or the assisted start procedure as expressed hereinbelow. These optional sensors include for example an engine temperature sensor 172, an air temperature sensor 174, an atmospheric air pressure sensor 176, an exhaust temperature sensor 178, a timer 180 and an ECU temperature sensor 182.

The engine temperature sensor 172 is mounted to the ICE 24 to sense the temperature of one or more of the crankcase 102, the cylinder block 104, the cylinder head 108 and engine coolant temperature. The engine temperature sensor 172 sends a signal representative of the sensed temperature to the ECU 164.

The air temperature sensor 174 is mounted to the snowmobile 10, in the air intake system for example, to sense the temperature of the air to be supplied to the ICE 24. The air temperature sensor 174 sends a signal representative of the air temperature to the ECU 164.

The atmospheric air pressure sensor 176 is mounted to the snowmobile 10, in the air intake system for example, to sense the atmospheric air pressure. The atmospheric air pressure sensor 176 sends a signal representative of the atmospheric air pressure to the ECU 164.

The exhaust temperature sensor 178 is mounted to the exhaust manifold 140 or another portion of an exhaust system of the snowmobile 10 to sense the temperature of the exhaust gases. The exhaust temperature sensor 178 sends a signal representative of the temperature of the exhaust gases to the ECU 164.

The timer 180 is connected to the ECU 164 to provide information to the ECU 164 regarding the amount of time elapsed since the ICE 24 has stopped. The timer 180 can be an actual timer which starts when the ICE 24 stops. Alternatively, the function of the timer 180 can be obtained from a calendar and clock function of the ECU 164 or another electronic component. In such an implementation, the ECU 164 logs the time and date when the ICE 24 is stopped and looks up this data to determine how much time has elapsed since the ICE 24 has stopped when the ECU 164 receives a signal from the electric start switch 168 that the user desires the ICE 24 to be started.

The ECU temperature sensor 182 is mounted to a physical module (not shown) that includes one or more processors (not shown) configured to execute the functions of the ECU 164. The ECU temperature sensor 182 sends a signal representative of the temperature of that module to the ECU 164.

It is contemplated that one or more of the sensors 172, 174, 176, 178, 182 and the timer 180 could be omitted. It is also contemplated that one or more of the sensors 172, 174, 176, 178, 180, 182 and the timer 180 could be used only under certain conditions. For example, the exhaust temperature and pressure sensors 178, 180 may only be used if the ICE 24 has been recently stopped, in which case some exhaust gases would still be present in the exhaust system, or following the first combustion of a fuel-air mixture in one of the combustion chambers 120A, 120B.

The ECU 164 uses the inputs received from at least some of the electric start switch 168, the sensors 167, 170, 172, 174, 176, 178, 182 and the timer 180 to retrieve one or more corresponding control maps 166 and to control the motor-generator 144, the fuel injectors 132a, 132b, and the spark plugs 134a, 134b using these inputs and/or the control maps 166 to start the ICE 24, as the case may be. The inputs and control maps 166 are also used to control the operation of the ICE 24 once it has started.

The ECU 164 is also connected to a display 186 provided on the snowmobile 10 near the handlebar 36 to provide information to the user of the snowmobile 10, such as engine speed, vehicle speed, oil temperature, and fuel level, for example.

Figure 7:
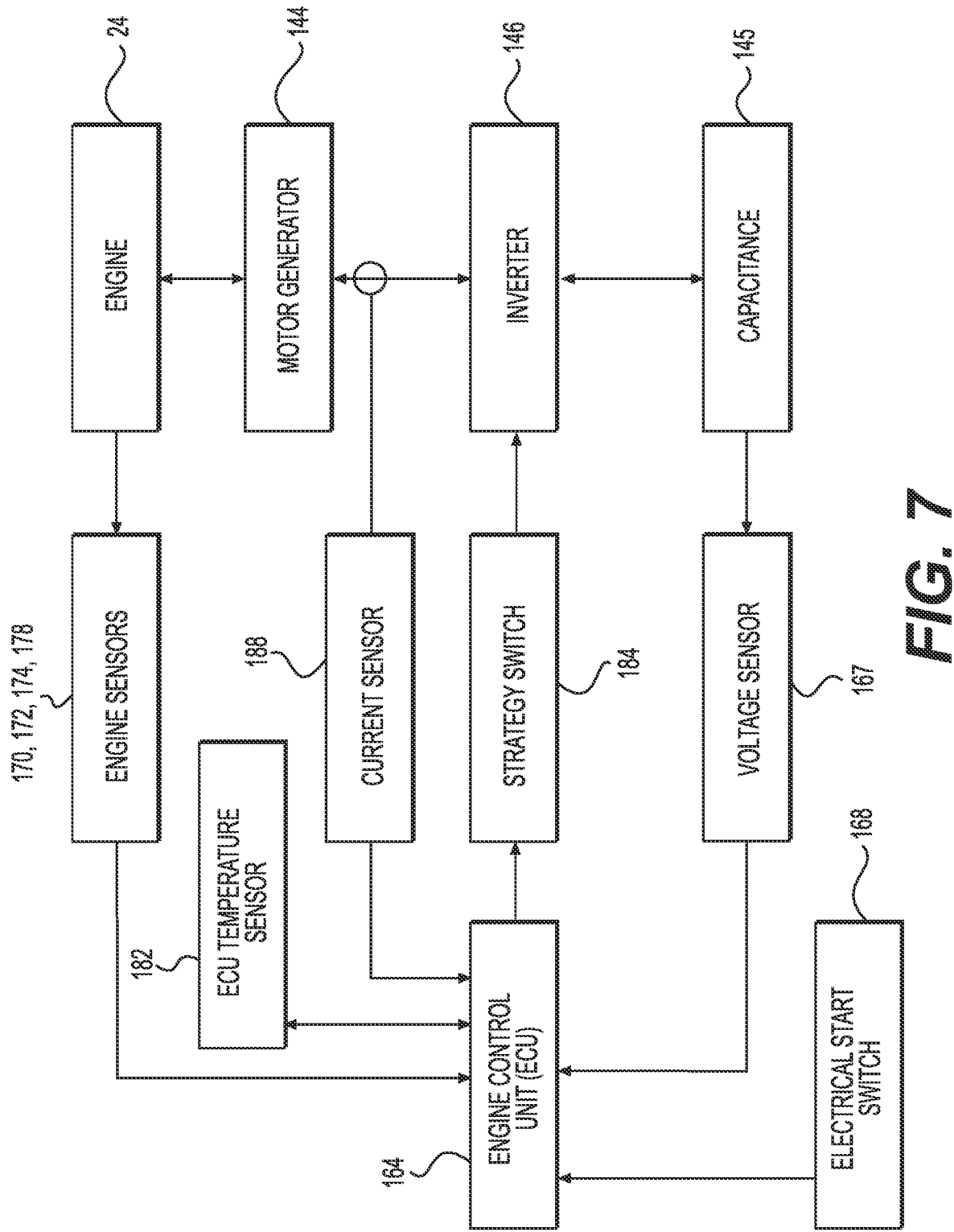
FIG. 7 is a block diagram of a dual-strategy control system for delivery of electric power between the capacitance and the electric turning machine (ETM) of FIG. 6.

Turning now to FIG. 7, details of an electronic system for the electric and assisted start procedures for the ICE 24 will now be described. FIG. 7 is a block diagram of a dual-strategy control system for delivery of electric power between the capacitance and the ETM of FIG. 6. Some components introduced in the foregoing description of FIG. 6 are reproduced in FIG. 7 in order to provide more details on their operation.

Electric power is delivered between the capacitance 145 and the motor-generator 144 through the inverter 146. The ECU 164 includes, or is otherwise operatively connected to, a strategy switch 184 that is operative to change the control strategy for the delivery of electric power between the capacitance 145 and the motor-generator 144 between at least two (2) distinct control strategies. The ECU 164 controls the inverter 146 through the strategy switch 184.

To start the ICE 24 using the electric start procedure, the user of the snowmobile 10 enters an input on the electric start switch 168, for example by depressing a push button. The ECU 164 is informed of this command. In response, the ECU 164 may control a delivery of electric power from the capacitance 145 to the motor-generator 144 based on a pre-determined amount of torque, or torque request, sufficient to cause rotation of the crankshaft 100 for starting the ICE 24. In a variant, the ECU 164 may determine the torque request. The determination of the torque request is made considering that ICE 24 is expected to have a highly irregular resistive torque; alternatively, instead of determining the torque request, the ECU 164 may determine a speed request applicable to the crankshaft 100 to control an amount of power that that the motor-generator 144 should apply to the crankshaft 100 for starting the ICE 24. A voltage of the capacitance 145 is sensed by the voltage sensor 167 and provided to the ECU 164. If this voltage is below an electric start voltage threshold $V_{MinE}$, which is a minimum voltage of the capacitance 145 for the electric start procedure, the ECU 164 determines that the capacitance 145 does not hold sufficient energy to provide the torque request, or the speed request, sufficient to start the ICE 24 using the electric start procedure. Consequently, the ECU 164 does not allow starting the ICE 24 using the electric start procedure and causes the display 186 to show a "manual start" indication or an "assisted start" indication, in implementations where this option is available. Generally speaking, the electric start voltage threshold $V_{MinE}$ is based on a determination of a sufficient charge of the capacitance 145 allowing a successful electric start procedure in most operating conditions. If this minimum voltage threshold for the electric start procedure is met, the ECU 164 causes delivery of electric power from the capacitance 145 to the motor-generator 144, via the inverter 146, in a first control strategy, initiating a rotation of the crankshaft 100. The ECU 164 also causes the fuel injectors 132a and 132b to inject fuel in the combustion chambers 120A, 120B and causes the spark plugs 134a and 134b to ignite the fuel in the combustion chambers 120A, 120B. As mentioned hereinabove, the ICE 24 may comprise one or more cylinders and the mention of two (2) combustion chambers 120A and 120B is for explanation purposes only. If these operations are successful, the rotation of the crankshaft 100 reaches a minimum revolution threshold corresponding to a successful start of the ICE 24. Thereafter, when a speed of the crankshaft 100 is equal to or above the minimum revolution threshold, the ECU 164 controls the delivery of electric power from the motor-generator 144 to the capacitance 145, still via the inverter 146, to cause charging of the capacitance 145. The delivery of electric power from the motor-generator 144 to the capacitance 145 generally occurs in a second control strategy distinct from the first control strategy. A variant in which the delivery of electric power from the motor-generator 144 to the capacitance 145 occurs in the first control strategy at low revolution speeds of the crankshaft 100, or under low throttle demands, and in the second control strategy at high revolution speeds of the crankshaft 100 is also contemplated.

A current sensor 188 may be used to optimize the capacitance 145 current consumption and optimize its energy usage. The current sensor 188 provides to the ECU 164 an indication of the energy from the capacitance 145 being consumed during the electric start procedure. In an implementation, the current sensor 188 comprises a combination of phase current sensors (not explicitly shown) provided on two (2) phases of the motor-generator 144. Encoding of measurements from these two (2) phase current sensors provide a good estimation of a current flowing between the capacitance 145 and the motor-generator 144. As shown on FIG. 13, current measurements may be obtained on all three (3) phases of the motor-generator 144. The capacitance 145 energy usage can alternatively be optimized without current sensors, for example, an open loop approach having a predetermined torque request pattern being applied by the ECU 164 to drive all cranking sequences can be used. It is also possible to optimize the energy usage of the capacitance 145 based on a speed request with well-tuned regulators or based on a predetermined pattern of multistep speed requests.

Electric start of the ICE 24 may fail although initial conditions for the electric start procedure were initially present. This may occur for instance if, while electric power is being delivered from the capacitance 145 to the motor-generator 144, the voltage sensor 167 detects that the voltage of the capacitance 145 falls below a residual voltage threshold $V_{MinR}$, lower than the electric start voltage threshold $V_{MinE}$, before the rotational speed of the crankshaft 100 reaches the minimum revolution threshold corresponding to the successful start of the ICE 24. Under such conditions, the ECU 164 ceases the delivery of power from the capacitance 145 to the motor-generator 144 and causes the display 186 to provide a manual start indication or an assisted start indication, in implementations where this option is available. Generally speaking, the residual voltage threshold $V_{MinR}$ corresponds to a minimum charge of the capacitance 145 that is expected to suffice in allowing the injection and ignition of fuel injection in the combustion chambers 120A, 120B while continuing the rotation of the crankshaft 100.

To start the ICE 24 using the assisted start procedure, the user of the snowmobile 10 pulls on the rope 158 of the recoil starter 156, initiating a rotation of the crankshaft 100. The crankshaft position sensor 170 informs the ECU 170 of the rotation of the crankshaft 100. In response, the ECU 164 may control a delivery of electric power from the capacitance 145 to the motor-generator 144 to assist the rotation of the crankshaft 100 for starting the ICE 24. Optionally, a voltage of the capacitance 145 is sensed by the voltage sensor 167 and provided to the ECU 164. In this case, if this voltage is below an assisted start voltage threshold $V_{MinA}$, which is a minimum voltage of the capacitance 145 for the assisted start procedure, the ECU 164 determines that the capacitance 145 does not hold sufficient energy to assist starting the ICE 24 and the ECU 164 does not allow starting the ICE 24 using the assisted start procedure, instead causing the display 186 to show a "manual start" indication. Generally speaking, the assisted start voltage threshold $V_{MinA}$ is based on a determination of a sufficient charge of the capacitance 145 allowing a successful assisted start procedure in predetermined operating conditions. In implementations where both electric and assisted start procedures are present, the assisted start voltage threshold $V_{MinA}$ is lower than the electrical start voltage threshold $V_{MinE}$. If this minimum voltage threshold for the assisted start procedure is met, the ECU 164 causes delivery of electric power from the capacitance 145 to the motor-generator 144, via the inverter 146, in the first control strategy, assisting the rotation of the crankshaft 100. The ECU 164 also causes the fuel injectors 132*a* and 132*b* to inject fuel in the combustion chambers 120A, 120B and causes the spark plugs 134*a* and 134*b* to ignite the fuel in the combustion chambers 120A, 120B. As mentioned hereinabove, the ICE 24 may comprise one or more cylinders and the mention of two (2) combustion chambers 120A and 120B is for explanation purposes only. If these operations are successful, the rotation of the crankshaft 100 reaches a minimum revolution threshold corresponding to a successful start of the ICE 24. Thereafter, operation of the ICE 24 is as expressed in the foregoing description to the electrical start procedure.

Figure 8:
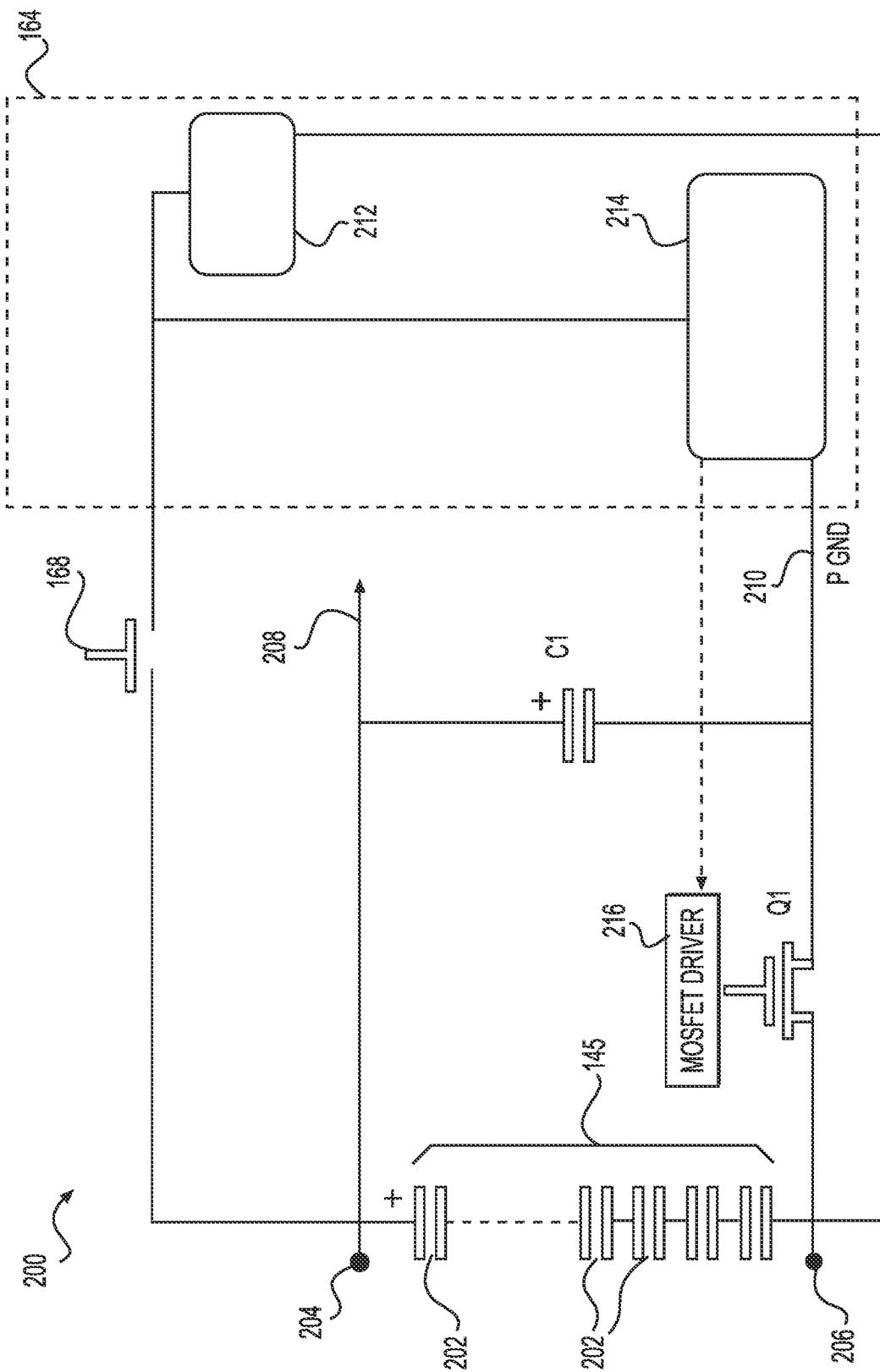
FIG. 8 is a block diagram of an energy management circuit for the capacitance of FIG. 6.

FIG. 8 is a block diagram of an energy management circuit for the capacitance 145 of FIG. 6. A circuit 200 shows how, in an implementation, the ECU 164 and the capacitance 145 are electrically connected using the electric start switch 168, which is shown as a pushbutton. The capacitance 145 is illustrated as a sum of smaller capacitors 202 connected in series. As mentioned earlier, each of these smaller capacitors 202 may actually consist of a plurality of capacitors connected in parallel. Each of the smaller capacitors 202 can withstand a relatively low voltage applied thereon. The capacitance 145 formed by the sum of the smaller capacitors 202 in series can withstand the nominal voltage of the circuit 200, which is also the nominal voltage of the electrical systems of the snowmobile 10, with the addition of a safety margin for occasional overvoltage. The voltage present on the capacitance 145 is defined between terminals 204 and 206 that are electrically connected to the voltage sensor 167 shown on earlier Figures.

The circuit 200 provides an output voltage between a lead 208 and a ground reference 210 when the circuit 200 is active. When the circuit 200 is inactive, the capacitance 145 is disconnected from the ground reference 210 by a metal-oxide semiconductor field effect transistor (MOSEFT) Q1 which is, at the time, turned off and therefore open circuit. Substituting a bipolar transistor, for example an insulated gate bipolar transistor (IGBT), for the MOSFET Q1 is also contemplated.

A capacitor C1 is present between the lead 208 and the ground reference 210. The role of the capacitor C1 is to filter voltage variations at the output 204 for the benefit of the various electrical components of the snowmobile 10, including for example the fuel injectors 132*a* and 132*b*, headlights, and the like. The voltage between the lead 208 and the ground reference 210, which is a system voltage for the snowmobile 10, is essentially the same as the nominal voltage of the capacitance 145, although operating voltages between different system states may not be constant at all times.

When the ICE 24 has been stopped for a long time, more than a few hours for example, the voltage on the capacitance 145 falls below the electric start voltage threshold $V_{MinE}$ and below the assisted start voltage threshold $V_{MinA}$, and the circuit 200 is not energized. Resorting to the manual start procedure is therefore required for starting the ICE 24. When the ICE 24 has been stopped for a relatively short time, a duration of which depends in large part on the energy storage capacity of the capacitance 145, the voltage on the capacitance 145 may be equal to or above the electric start voltage threshold $V_{MinE}$, in which case the electric start procedure is available. If the voltage of the capacitance 145 is lower than the electric start voltage threshold $V_{MinE}$ while at least equal to or greater than the assisted start voltage threshold $V_{MinA}$, the assisted start procedure may be available. The assisted start procedure is described in more details hereinbelow.

When the voltage of the capacitance 145 is at least equal or greater than the electric start voltage threshold $V_{MinE}$, the user may depress the electric start switch 168 (pushbutton) to invoke the electric start procedure. This user action is sensed by a button state detector 212 of the ECU 164. The button state detector 212 being referenced to the terminal 206, it becomes placed in parallel with the capacitance 145 when the start switch 168 is depressed. At the same time, electrical power is provided from the capacitance 145 to the ECU 164, waking up the ECU 164. Depending on specific implementations, the button state detector 212 may accept a simple brief electrical contact provided by the electric start switch 168 to initiate the electric start procedure. The button state detector 212 may alternatively require the electric start switch 168 to be depressed for a few seconds. A variant in which the button state detector 212 is not present, in which the electric start switch 168 needs to be depressed until the ICE 24 is actually started is also contemplated. After sensing the electric start command, the button state detector 212 sends a signal to a wake up circuit 214 of the ECU 164. The wake up circuit 214 controls the following operations.

Initially, the wake up circuit 214 applies a signal to a driver 216 of the transistor Q1. The transistor Q1 turns on, effectively placing the capacitance 145 in parallel with the capacitor C1. The wake up circuit 214 can control the driver 216 to turn on and off the transistor Q1 at a high frequency in order to prevent excessive current flowing from the capacitance 145 to the capacitor C1. Electrical conduction through the transistor Q1 may be controlled in a small duty cycle at first, the duty cycle increasing as a voltage difference between the capacitor C1 and the capacitance 145 decreases. Regardless, the capacitor C1 rapidly charges to reach the voltage of the capacitance 145. The capacitance 145 voltage may reduce slightly, but this effect is limited by the fact that the capacitor C1 is much smaller than the capacitance 145. After the capacitor C1 has been charged, the electric start continues with the ECU 164 controlling the delivery of power from the capacitance 145 to the motor-generator 144 via the lead 208, which is connected to the inverter 146.

Once the electric start procedure has been successfully executed, as engine is running at idle, the motor-generator 144 may initially have a limited power generating capacity. Accessories of the snowmobile 10, including for example the fuel injectors 132*a* and 132*b* and headlights, require a certain amount of power. It is more critical to the operation of the vehicle to power these accessories than recharging the capacitance 145. To avoid an excessive drop of the voltage of the capacitor C1, at the lead 208, while the ICE 24 is idling, the ECU 164 may optionally control the driver 216 to turn off the transistor Q1 until the crankshaft 100 rotates at more than a predetermined revolution threshold. Once the ICE 24 has acquired a sufficient speed, the voltage at the lead 208 being now sufficient, the ECU 164 may again control the driver 216 and the transistor Q1 to place the capacitance 145 in parallel with the capacitor C1. Once again, in order to avoid excessive current flowing from the capacitor C1 to the capacitance 145 and to avoid an excessive voltage drop at the lead 208, the transistor Q1 may be turned on and off at a small duty cycle at first, the duty cycle increasing as a voltage difference between the capacitor C1 and the capacitance 145 decreases. The transistor Q1 may therefore be controlled in order to regulate the charging rate of capacitance 145 while respecting the electrical power availability at any speed of the ICE 24. The ECU 164 may optionally integrate an automatic shutdown circuit that may terminate all electrical functions of the snowmobile 10 in case of system failure.

Table I provides a sequence of events including a manual start procedure of the ICE 24, followed by an electric start procedure command received after a waiting time that does not exceed the capabilities of the electric start system. In Table I, mentions of "PWM" refer to "pulse width modulation", a technique used in the first and second control strategies as expressed hereinbelow.

304. A comparison is made by the ECU 164, at operation 306, between the voltage of the capacitance 145 and the electric start voltage threshold $V_{MinE}$ to determine whether it is possible to initiate the electric start procedure for the ICE 24. If it is determined that the voltage of the capacitance 145 is below the electric start voltage threshold $V_{MinE}$, the electric start procedure is prevented. Otherwise, verification is made at operation 308 that the engine temperature measured by the engine temperature sensor 172 meets or exceeds an engine temperature threshold $T_0$. The electric start procedure is prevented in this threshold for the engine temperature is not met. Otherwise, verification is made at operation 310 that the ECU temperature sensor 182 provides a reading of the temperature of the ECU 164 that meets or

TABLE I

| TYPE | Event | ECU 164 state | C1 voltage | Capacitance 145 voltage | Driver 216 duty cycle | Motor-generator 144 |
|---|---|---|---|---|---|---|
| MANUAL | Initial conditions | OFF | 0 volt | 0 volt | 0% | Stopped |
| | Pulling the rope (1st time) | Wake-Up | Rising | 0 volt | 0% | Rising speed |
| | Pulling the rope (2nd time) | Firing | Rising to nominal voltage | 0 volt | 0% | Rising to idle speed |
| | Releasing the rope | Ignition/PWM | Nominal voltage | Rising, but less than nominal voltage | Partial to allow charging of the capacitance | Idle speed |
| | Ready to apply throttle | Ignition/PWM | Nominal voltage | Rising, but less than nominal voltage | Partial to allow charging of the capacitance | Slow charging |
| | Partial or full throttle | Ignition/PWM | Nominal voltage | Nominal voltage | 100% | Charging |
| — | Stop | Turning OFF | Falling | Nominal voltage | 0% | Falling speed |
| | Waiting time | OFF | Close to 0 volt | Less than nominal voltage, but equal to or above $V_{MinE}$ | 0% | Stopped |
| ELECTRIC | Electric start command | Wake-Up | Close to 0 volt | Less than nominal voltage, but equal to or above $V_{MinE}$ | 0% | Stopped |
| | — | Ignition/PWM | Equalizing to the capacitance voltage | Reducing slightly | Partial to allow voltage equalization | Stopped |
| | — | Cranking | Equal to the capacitance voltage | Reducing, but still equal to or above $V_{MinR}$ | 100% | Rising speed |
| | — | Firing | Rising | Rising | 100% | Rising to idle speed |
| | Ready to apply throttle | Ignition/PWM | Nominal voltage | Nominal voltage | 100% | Idle speed |

In at least one implementation in which the fuel injectors 132a and 132b are direct fuel injectors, both minimum voltage thresholds $V_{MinE}$ and $V_{MinR}$ may be defined within an operating voltage range of the direct fuel injectors so that, if the voltage of the capacitance 145 is not sufficient for the direct fuel injectors to inject fuel in the cylinders 106A, 106B, the electric start procedure is not attempted, or terminated if unsuccessful.

Electric Start Procedure

Figure 9:
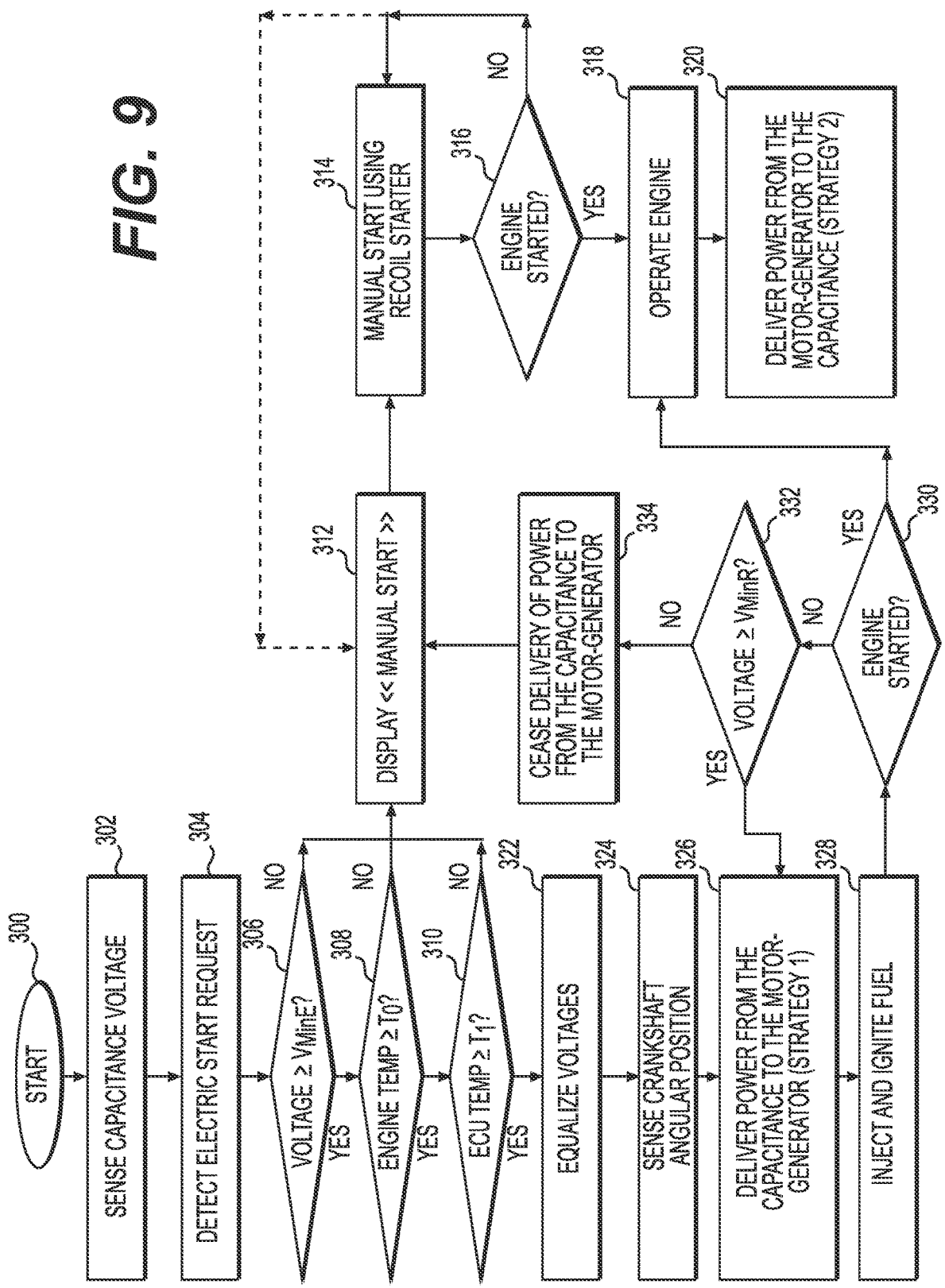
FIG. 9 is a logic diagram of a method for starting the engine of FIG. 2 according to an implementation.

FIG. 9 is a logic diagram of a method for starting the engine of FIG. 2 according to an implementation. A sequence shown in FIG. 9 comprises a plurality of operations, some of which may be executed in variable order, some of the operations possibly being executed concurrently, and some of the operations being optional. The method begins at operation 300 when the ICE 24 of the snowmobile 10 is stopped. A voltage of the capacitance 145 is measured by the voltage sensor 167 at operation 302. In the same operation 302, the display 186 may provide an "automatic start" indication if the voltage meets or exceeds the electric start voltage threshold $V_{MinE}$ and if other conditions described hereinbelow for the electric start procedure are met. The user actuates the electric start switch 168, this being detected by the button state detector 212 at operation exceeds an ECU temperature threshold $T_1$. The electric start procedure is prevented if this threshold for the ECU temperature is not met. Additional operations related to use of measurements obtained from other sensors introduced in the foregoing description of FIG. 6 may take place. These measurements may be provided to the ECU 164 by the air temperature sensor 174, the atmospheric temperature sensor 176, or the timer 180. Additional tests based on those measurements may be executed by the ECU 164 to determine whether or not the electric start procedure is likely to succeed or to determine a torque value sufficient to cause the rotation of the crankshaft 100. For example, the electric start procedure may be made conditional, in the ECU 164, on the timer 180 informing the ECU 164 that a period of time since the ICE 24 has been stopped is below a predetermined time value when the user actuates the electric start switch 168 at operation 304. On the basis of the period of time since the ICE 24 has been stopped, it is possible to estimate whether the voltage of the capacitance 145 will have fallen below the electric start voltage threshold $V_{MinE}$ knowing a maximum charge voltage of the capacitance 145 from a previous running sequence of the ICE 24, and based on a typical energy leakage of the capacitance 145.

Whether the electric start procedure is prevented because the voltage of the capacitance 145 is insufficient (operation 306), because the engine temperature is too low (operation 308), because the ECU temperature is too low (operation 310), or for any other reason, the method proceeds to operation 312. At operation 312, the ECU 164 causes the display 186 to display "Manual Start" or some other message indicating to the user of the snowmobile 10 that the snowmobile 10 will need to be started manually using the recoil starter 156 (i.e. by pulling on the handle 163). In implementations where the assisted start procedure is available, the display 186 may instead display "Assisted Start" or some other equivalent message, provided that current conditions allow using this procedure. Displaying the manual start indication or the assisted start indication at operation 312 may follow any decision taken by the ECU 164 to not proceed with the electric start procedure. It is contemplated that instead of providing a message on the display 186, that the ECU 164 could cause a sound to be heard or provide some other type of feedback to the user of the snowmobile 10, indicating that the snowmobile 10 will need to be started manually using the recoil starter 156. A manual start procedure or an assisted start procedure may be initiated when the user pulls on the rope 158 of the recoil starter 156. If conditions for the assisted start procedure are met, this procedure may be initiated as described hereinbelow. Otherwise, when the conditions for the assisted start procedure are not met, the manual start procedure may be initiated at operation 314 when, in response to sensing the operation of the recoil starter 156 by the user of the snowmobile 10, the ECU 164 initiates an engine control procedure associated with the use of the recoil starter 156 in order to start the ICE 24 using the recoil starter 156. Then at operation 316, the ECU 164 determines if the ICE 24 has been successfully started using the recoil starter 156. If not, then operation 314 is repeated. It is also contemplated that if at operation 316 it is determined that the ICE 24 has not been successfully started, that the method could return to operation 312 to display the message again. If at operation 316 it is determined that the ICE 24 has been successfully started, then the method proceeds to operations 318 and 320, these last two (2) operations being operated concurrently. At operation 318, the ECU 164 operates the ICE 24 according to the control strategy or strategies to be used once the ICE 24 has started. At operation 320, the ECU 164 controls the inverter 146 to cause power to be delivered from the motor-generator 144 to the capacitance 145, charging the capacitance 145 using the second control strategy at a voltage that remains fairly constant for a wide range of rotational speeds of the crankshaft 100. This may be achieved by the ECU 164 shunting one or more of the Phases A, B and C of the motor-generator 144 if, in the second control strategy, the motor-generator 144 generates a voltage that exceeds a maximum voltage threshold. The ECU 164 may linearly regulate the voltage generated by the motor-generator 144 may be using a series regulation mode or a shunt mode. The maximum voltage threshold may for example be equal or slightly superior to the nominal voltage of the circuit 200.

If at operations 306, 308 and 310 the ECU 164 determines that the capacitance voltage is equal to or above the electric start voltage threshold $V_{MinE}$ and that the temperature conditions and any other condition are also met, the method continues at operation 322 where the ECU 164 controls the driver 216 of the transistor Q1 to place the capacitance 145 in parallel with the capacitor C1 to equalize their voltages. Then at operation 324, the ECU 164 obtains a value of the angular position of the crankshaft 100 from the crankshaft position sensor 170. This operation 324 may continue on an ongoing fashion during the complete electric start procedure so that the following operations may be optimized according to the varying angular position of the crankshaft 100. It is contemplated that operations 322 and 324 may be omitted or substituted with other actions. For example, the electric start procedure may be rendered independent from the angular position of the crankshaft 100 by providing a capacitance 145, the battery, or other power source having sufficient energy storage capability to rotate the crankshaft 100 with no concern for its actual angular position.

The electric start procedure proceeds with operation 326 and continues through operations 328, 330 and, if required, operation 332. These operations are initiated in the sequence as shown on FIG. 9, but are then executed concurrently until the electric start procedure is found successful or until it needs to be terminated.

At operation 326, the ECU 164 determines the torque value sufficient to cause the rotation of the crankshaft 100 and initiates delivery of power from the capacitance 145 to the motor-generator 144, through the inverter 146, via the first control strategy which adapts the delivery of power in view of the determined torque value. This transfer of power causes a rotation of the crankshaft 100. Optionally, the ECU 164 may determine the torque value in sub-steps, in which a first sub-step comprises delivering electric power from the capacitance 145 to the three-phase motor-generator 144 according to a first torque value to cause slow turning of the crankshaft at a first rotational speed until the piston is brought beyond its top dead center (TDC), based on information provided by the crankshaft position sensor 170 and based on the contents of the control maps 166, a second sub-step comprising delivering electric power from the capacitance 145 to the three-phase motor-generator 144 according to a second torque value, greater than the first torque value to cause turning of the crankshaft at a second rotational speed, the second rotational speed being greater than the first rotational speed.

While operation 326 is ongoing, particularly while the second sub-step is ongoing if operation 326 comprises two sub-steps, the method proceeds to operation 328 in which the ECU 164 causes the fuel injectors 132a, 132b to inject fuel in the combustion chambers 132a, 132b and causes the spark plugs 134a, 134b to ignite the fuel in the combustion chambers 134a, 134b, thereby accelerating the rotation of the crankshaft 100. The angular position of the crankshaft 100 may be used by the ECU 164 to properly time the fuel injection and the ignition. In a particular implementation, the position sensor 170 is an absolute position sensor that can determine the position of the crankshaft 100 while it is stationary, prior to starting of the ICE 140. This technique provides precise fuel injection and ignition timing at a very low rotational speed of the ICE 24, such as when the ICE 24 is starting. This technique decreases the chances of a failed start-up procedure due to an insufficient combustion within the combustion chambers 120A, 120B, this insufficient combustion resulting from imprecise fuel injection quantities or ignition timing calculated from an imprecise crankshaft position. This technique further promotes faster synchronization between all components of the ICE 24 that rely on the position of the crankshaft 100 when compared to the use of position sensors that require the crankshaft 100 to be rotating to determine its position. Use of mechanical actuators (not shown) operably connected to the crankshaft 100 to control injection and ignition timings is also contemplated. It is further contemplated that a quantity of fuel to be injected and the ignition timing as applied by the ECU 164 at operation 328 may be evaluated using any known method, optionally depending on one or more of an engine temperature, an air temperature, an atmospheric pressure, and an exhaust temperature, these values being provided to the ECU 164 by the various sensors shown on FIG. 6.

While operations 326 and 328 are ongoing, the method proceeds to operation 330, in which the ECU 164 compares a rotational speed of the crankshaft 100 to a minimum revolution threshold to determine if the ICE 24 has been successfully started using the electric start procedure. If the rotational speed of the crankshaft 100 is equal to or above the minimum revolution threshold, the ICE 24 has been successfully started, the electric start procedure ends and the method proceeds to operations 318 and 320, which are described hereinabove.

If, at operation 330, the ECU 164 determines that the ICE 24 has not yet been started, the rotational speed of the crankshaft 100 being below the minimum revolution threshold, the method continues at operation 332 where the ECU 164 monitors again the voltage of the capacitance 145. It is expected that this voltage will be reduced somewhat as energy previously stored in the capacitance 145 has been spent during operations 326 and 328. However, if a remaining voltage of the capacitance 145 is equal to or above the residual voltage threshold $V_{MinR}$, the electric start procedure returns to operations 326 and 328, which are still ongoing, and then at operation 330. If however the ECU 164 determines at operation 332 that the capacitance voltage has fallen below the residual voltage threshold $V_{MinR}$, the method proceeds to operation 334 where the ECU 164 ceases the delivery of power from the capacitance 145 to the motor-generator 144 and terminates operations 326 and 328. The method then moves from operation 334 to operation 312, which is described hereinabove, in which the ECU 164 causes the display 186 to display a manual start indication, or an assisted start indication in implementations where this option is available, operation 312 being followed by operations 314, 316, 318 and 320 in the case of a manual start.

Figure 10:
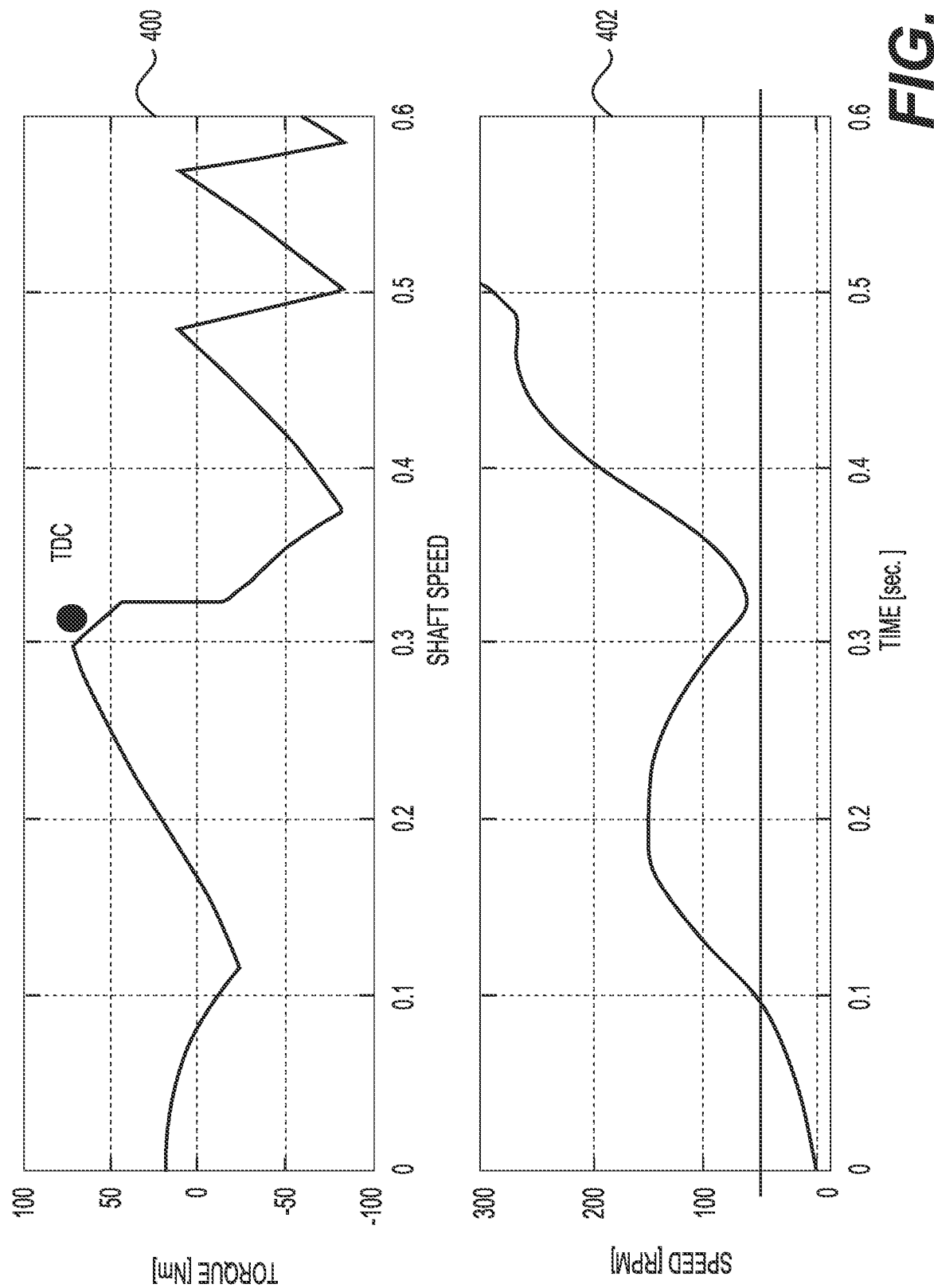
FIG. 10 is a timing diagram showing an example of variations of an engine resistive torque as a function of time along with corresponding engine rotational speed variations.

FIG. 10 is a timing diagram showing an example of variations of an engine resistive torque as a function of time along with corresponding engine rotational speed variations. A graph 400 shows a variation of the resistive torque of the ICE 24, in Newton-Meters (Nm) as a function of time, in seconds. The graph 400 was obtained from a Simulink™ model. A graph 402 shows a corresponding variation of a rotational speed of the crankshaft 100 over the same time scale. In the simulation, the two-cylinder ICE 24 is firing when a piston first reaches near TDC. After less than 0.1 seconds, the resistive torque becomes negative because the piston has passed beyond its TDC. Compression present in the combustion chamber pushes on the piston and accelerates the rotation of the crankshaft 100. At about 0.12 seconds, the ECU 164 controls the torque applied to the crankshaft 100 by the motor-generator 144, accelerating the rotation of the crankshaft 100. The rotational speed of the crankshaft 100 reaches a plateau at about 0.17 seconds because the piston is now compressing gases present in the combustion chamber. The rotational speed decreases as the piston arrives near its TDC. TDC is reached at about 0.32 seconds. Successful ignition takes place, whereafter the rotational speed of the crankshaft 100 increases rapidly while the resistive torque on the motor-generator 144 becomes essentially negative, following a toothed saw wave shape as the piston cycles up and down in its cylinder.

Assisted Start Procedure

Figure 11:
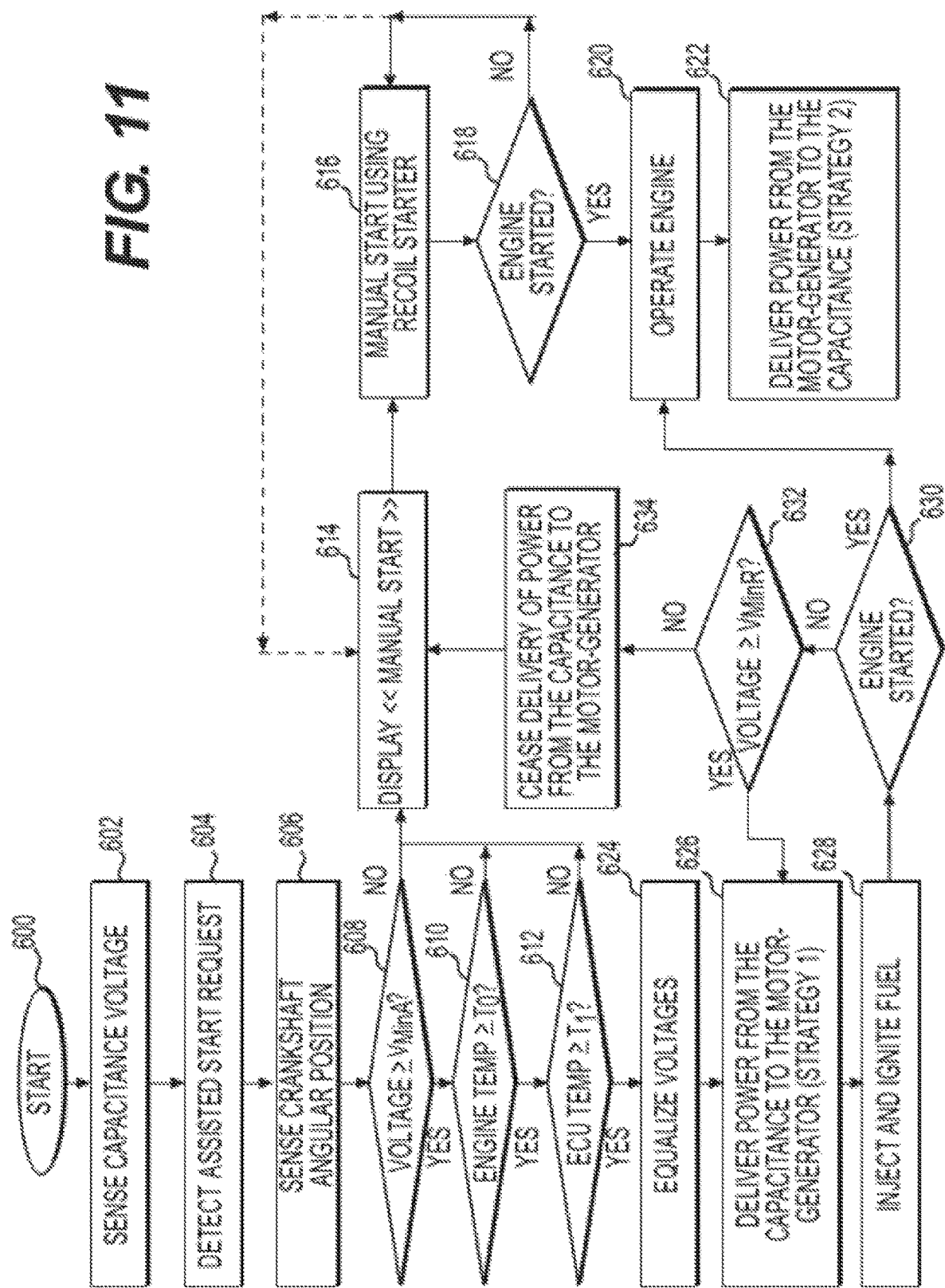
FIG. 11 is a logic diagram of a method for starting the engine of FIG. 2 according to another implementation.

FIG. 11 is a logic diagram of a method for starting the engine of FIG. 2 according to another implementation. A sequence shown in FIG. 11 comprises a plurality of operations, some of which may be executed in variable order, some of the operations possibly being executed concurrently, and some of the operations being optional. The method begins at operation 600 when the ICE 24 of the snowmobile 10 is stopped. A voltage of the capacitance 145 is measured by the voltage sensor 167 at operation 602. In the same operation 602, the display 186 may provide an "assisted start" indication if the voltage meets or exceeds the assisted start voltage threshold $V_{MinA}$ and if other conditions described hereinbelow for the assisted start procedure are met. At operation 604, the user initiates a rotation of the crankshaft 100 by pulling on the rope 158 of the recoil starter 156. At operation 606, the crankshaft position sensor 170 detects an initial rotation of the crankshaft 100 and informs the ECU 164 of the rotation. Detecting the initial rotation of the crankshaft 100 may be conditional to the crankshaft position sensor 170 detecting that a revolution speed of the crankshaft 100 meets or exceeds a minimal revolution threshold. A comparison is made by the ECU 164 at operation 608 between the voltage of the capacitance 145 and the assisted start voltage threshold $V_{MinA}$ to determine whether it is possible to initiate the assisted start procedure for the ICE 24. If it is determined that the voltage of the capacitance 145 is below the assisted start voltage threshold $V_{MinA}$, the assisted start procedure is prevented. Otherwise, verification is made at operation 610 that the engine temperature measured by the engine temperature sensor 172 meets or exceeds an engine temperature threshold $T_0$. The assisted start procedure is prevented in this threshold for the engine temperature is not met. Otherwise, verification is made at operation 612 that the ECU temperature sensor 182 provides a reading of the temperature of the ECU 164 that meets or exceeds an ECU temperature threshold $T_1$. The assisted start procedure is prevented if this threshold for the ECU temperature is not met. Additional operations related to the use of measurements obtained from other sensors introduced in the foregoing description of FIG. 6 may take place. These measurements may be provided to the ECU 164 by the air temperature sensor 174, the atmospheric temperature sensor 176, or the timer 180. Additional tests based on those measurements may be executed by the ECU 164 to determine whether or not the assisted start procedure is likely to succeed. For example, the assisted start procedure may be made conditional, in the ECU 164, on the timer 180 informing the ECU 164 that a period of time since the ICE 24 has been stopped is below a predetermined time value when the user pulls on the rope 158 of the recoil starter 156 at operation 604, On the basis of the period of time since the ICE 24 has been stopped, it is possible to estimate whether the voltage of the capacitance 145 will have fallen below the assisted start voltage threshold $V_{MinA}$ knowing a maximum charge voltage of the capacitance 145 from a previous running sequence of the ICE 24, and based on a typical energy leakage of the capacitance 145.

Displaying the manual start indication at operation 614 may follow any decision taken by the ECU 164 to not proceed with the assisted start procedure. Whether the assisted start procedure is prevented because the voltage of the capacitance 145 is insufficient (operation 608), because the engine temperature is too low (operation 610), because the ECU temperature is too low (operation 612) or for any other reason, the method proceeds to operation 614. At operation 614, the display 186 may display "Manual Start". Following operation 614, the user may continue pulling on the rope 158 of the recoil starter 156 at operation 616. Operation 616 may continue until it is detected at operation 618 that the ICE 24 is properly started. Control of ICE 24 and delivery of electric power from the motor-generator 144 to the capacitance 145 follow at 620 and 622, which are the same or equivalent as operations 318 and 320 of FIG. 9 including, in an implementation, controlling the ICE 24 using the above described control strategies.

If at operations 608, 610 and 612, the ECU 164 determines that the capacitance voltage is equal to or above the assisted start voltage threshold $V_{MinA}$ and that the temperature conditions and any further condition are also met, the method continues at operation 624 where the ECU 164 controls the driver 216 of the transistor Q1 to place the capacitance 145 in parallel with the capacitor C1 to equalize their voltages.

The assisted start procedure proceeds with operation 626 and continues through operations 628, 630 and, if required, operation 632. These operations are initiated in the sequence as shown on FIG. 11, but are then executed concurrently until the assisted start procedure is found successful or until it needs to be terminated.

At operation 626, the ECU 164 initiates delivery of power from the capacitance 145 to the motor-generator 144, through the inverter 146. This transfer of power accelerates the rotation of the crankshaft 100 and reduces the amount of effort that needs to be exerted by the user pulling on the rope 158 of the recoil starter 156. The ECU 164 may optionally determine a torque value in the same manner as described in the foregoing description of operation 326 (FIG. 9).

While operation 626 is ongoing, the method proceeds to operation 628 in which the ECU 164 causes the fuel injectors 132a, 132b to inject fuel in the combustion chambers 132a, 132b and causes the spark plugs 134a, 134b to ignite the fuel in the combustion chambers 134a, 134b, thereby accelerating further the rotation of the crankshaft 100. The angular position of the crankshaft 100 may be used by the ECU 164 to properly time the fuel injection and the ignition. Use of mechanical actuators (not shown) operably connected to the crankshaft 100 to control injection and ignition timings is also contemplated. It is further contemplated that a quantity of fuel to be injected and the ignition timing as applied by the ECU 164 at operation 628 may depend on one or more of an engine temperature, an air temperature, an atmospheric pressure, and an exhaust temperature, these values being provided to the ECU 164 by the various sensors shown on FIG. 6.

While 626 and 628 are ongoing, the method proceeds to operation 630, in which the ECU 164 compares a rotational speed of the crankshaft 100 to a minimum revolution threshold to determine if the ICE 24 has been successfully started using the assisted start procedure. If the rotational speed of the crankshaft 100 is equal to or above the minimum revolution threshold, the ICE 24 has been successfully started, the assisted start procedure ends and the method proceeds to 620 and 622, which are described hereinabove.

If, at operation 630, the ECU 164 determines that the ICE 24 has not yet been started, the rotational speed of the crankshaft 100 being below the minimum revolution threshold, the method continues at operation 632 where the ECU 164 monitors again the voltage of the capacitance 145. It is expected that this voltage will be reduced somewhat as energy previously stored in the capacitance 145 has been spent during 626 and 628. However, if a remaining voltage of the capacitance 145 is equal to or above a residual voltage threshold, the assisted start procedure returns to operations 626 and 628, which are still ongoing, and then at operation 630. In one variant, the residual voltage threshold applicable to the assisted start procedure may be the same value $V_{MinR}$ as in the case of the electric start procedure. In another variant, a different residual voltage threshold may be used given that the amount of power delivered to the motor-generator 144 by the capacitance 145 complements the effort of the user pulling on the rope 158 of the recoil starter 156. If however the ECU 164 determines at operation 632 that the capacitance voltage has fallen below the residual voltage threshold $V_{MinR}$, the method proceeds to operation 634 where the ECU 164 ceases the delivery of power from the capacitance 145 to the motor-generator 144 and terminates operations 626 and 628. The method then moves from operation 634 to operation 614, which is described hereinabove, in which the ECU 164 causes the display 186 to display a manual start indication, operation 614 being followed by operations 616, 618, 620 and 622.

In an implementation, the snowmobile 10 may be configured to support any one of the manual, electric and assisted start procedures. In such implementation, operation 312 (FIG. 9) may provide a manual start or an assisted start indication, depending on the voltage of the capacitance 145. If the voltage of the capacitance is below the electric start voltage threshold $V_{MinE}$ while meeting or exceeding the assisted start voltage threshold $V_{MinA}$, operation 312 of FIG. 9 may provide the assisted start indication and may be followed by operation 604 of FIG. 11 if the user pulls on the rope 158 of the recoil starter 156. Also in this implementation, after having started the ICE 24 using the assisted start procedure, the ICE 24 may be stopped and the display 186 may provide an indication of the available start procedure depending on current conditions reported to the ECU 164 by the various sensors.

Implementations of the Control Strategies

Figure 12:
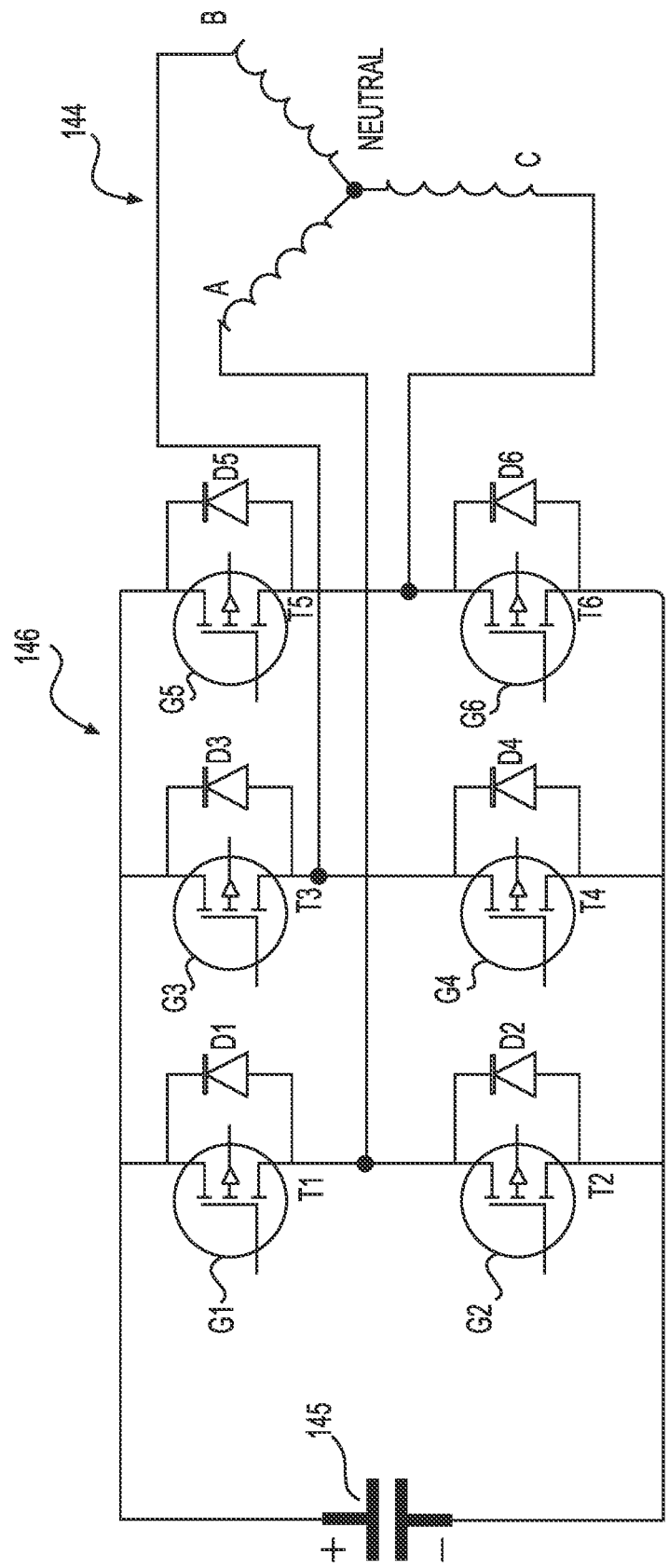
FIG. 12 is a circuit diagram showing connections between the inverter, the capacitance and the motor-generator of FIG. 6.

As expressed hereinabove, the ECU 164 controls the inverter 146 through the strategy switch 184. To this end, the ECU 164 generates control pulses that are applied to the strategy switch 184. These control pulses are generated differently in the two (2) control strategies. In at least one implementation, the effect of these control pulses depends on the internal structure of the inverter 144. FIG. 12 is a circuit diagram showing connections of the inverter 146, the capacitance 145 and the motor-generator 144 of FIG. 6. As shown on FIG. 12, the inverter 146 has three phases, each phase being electrically connected to a corresponding phase of the three-phase motor-generator 144. In more details, the inverter 146 is formed of three (3) switching legs, each switching leg including a pair of MOSFETs T1, T2, T3, T4, T5 and T6 matched with corresponding freewheel diodes D2, D1, D3, D2, D6 and D5. For instance, a first leg forming a first phase includes a top transistor T1 matched with a freewheel diode D2 and a bottom transistor T2 matched with a freewheel diode D1. A second leg forming a second phase includes transistors T3 and T4 matched with diodes D4 and D3 respectively while a third leg forming a third phase includes transistors T5 and T6 matched with diodes D6 and D5 respectively. As substitutes to MOSFETs, bipolar transistors, for example IGBTs, or any other power electronic switches are also contemplated. Each transistor T1-T6 has a corresponding gate G1-G6 through which a signal, or control pulse, can be applied under the control of the ECU 164 via the strategy switch 184, either directly or through a gate driver (not shown), to turn-on (short-circuit) or turn-off (open circuit) the corresponding transistors T1-T6. The freewheel diodes D1-D6 are used to attenuate transient overvoltage that occurs upon switching on and off of the transistors T1-T6.

For example, when the motor-generator 144 is in motor operating mode, being used as a starter for the ICE 24, a first control pulse is applied at the gate G1 to short-circuit the transistor T1. Current flows from a positive tab of the capacitance 145 through the transistor T1 and reaches a phase of the motor-generator 144 defined between an input A and a neutral connection between the phases of the motor-generator 144, hereinafter "Phase A". Thereafter, the first control pulse is removed from the gate G1 so the transistor T1 becomes an open-circuit. At the same time, a second control pulse is applied on the gate G2, causing the transistor T2 to turn-on. Current now flows in the opposite direction in Phase A of the motor-generator 144, returning to a negative tab of the capacitance 145 via the transistor T2. As a result of this sequence of turning on and off the transistors T1 and T2, an alternating current flows in the Phase A of the motor-generator 144.

The current flowing into Phase A of the motor-generator 144 needs to exit through one or both of the other phases of the motor-generator 144. "Phase B" is defined between an input B and the neutral connection. "Phase C" is defined between an input C and the neutral connection. The current flows from Phase A through Phase B, or Phase C, or both Phases B and C, depending on whether one or both of transistors T4 or T6 is turned on by control pulses applied on their respective gates G4 or G6 when the transistor T1 is also turned on. The current exiting the motor-generator 144 via one or both of Phases B and/or C returns to a negative tab of the capacitance 145 through one or both of the transistors T4 and/or T6. The freewheel diodes D1-D6 assist in supporting phase inductance currents during freewheel periods.

To operate the motor-generator 144 as a conventional three-phase motor, current would flow concurrently in all three (3) Phases A, B and C, a timing control of the various transistors T1-T6 being separated by 120 degrees. Other operating modes of the motor-generator 144 in which current does not concurrently flow in all three (3) Phases A, B and C are however contemplated.

Examples of parameters that may be considered by programming of the ECU 164 to control the delivery of electric power in both control strategies include, without limitation, current and voltage of each phase voltages and currents in each of the Phases A, B and C of the motor-generator 144, the angular position and rotational speed of the crankshaft 100. The ECU 164 uses these values to determine an electromagnetic torque of the motor-generator 144, this torque having positive value when the motor-generator 144 is used during the electric start procedure or the assisted start procedure and a negative value when used in generator operating mode.

The first control strategy uses a technique called vector control or field-oriented control (FOC). The first control strategy is used mainly to control the delivery of electric power from the capacitance 145 to the motor-generator 144 to cause or assist a rotation of the crankshaft 100 in the electric start procedure or in the assisted start procedure of the ICE 24. In one implementation, ECU 164 determines a torque request sufficient to cause the rotation of the crankshaft 100. In another implementation, the ECU 164 determines a speed request applicable to the crankshaft 100, sufficient to cause ignition and start of the ICE 24. This determination of the speed request or torque request may be made by the ECU 164 applying a predetermined speed or torque request value or pattern based on the contents of the control maps 166. The ECU 164 may increment the torque request if a first torque application causes no rotation of the crankshaft 100. The ECU 164 may increment the speed request if a rotation of the crankshaft 100 is not sufficient to allow ignition and start of the ICE 24. Alternatively, the ECU 164 may calculate the speed or torque request based on a combination of parameters, including in a non-limitative example a mathematical representation of internal components of the ICE 24 and on the angular position of the crankshaft 100. The ECU 164 controls the delivery of electric power from the capacitance 145 to the motor-generator 144, based on the determined speed request or torque request, through the generation of control pulses applied to selected ones of the transistors T1-T6. Using vector control, the ECU 164 calculates a number, timing, and width of the various control pulses so that the amount of electric power flowing from the capacitance 145 through the inverter 146 and to the motor-generator 144 fulfills the determined speed or torque request. This manner of controlling the transistors T1-T6 by applying timed pulses to their gates G1-G6, each pulse having a calculated width, is known as pulse width modulation (PWM).

Figure 13:
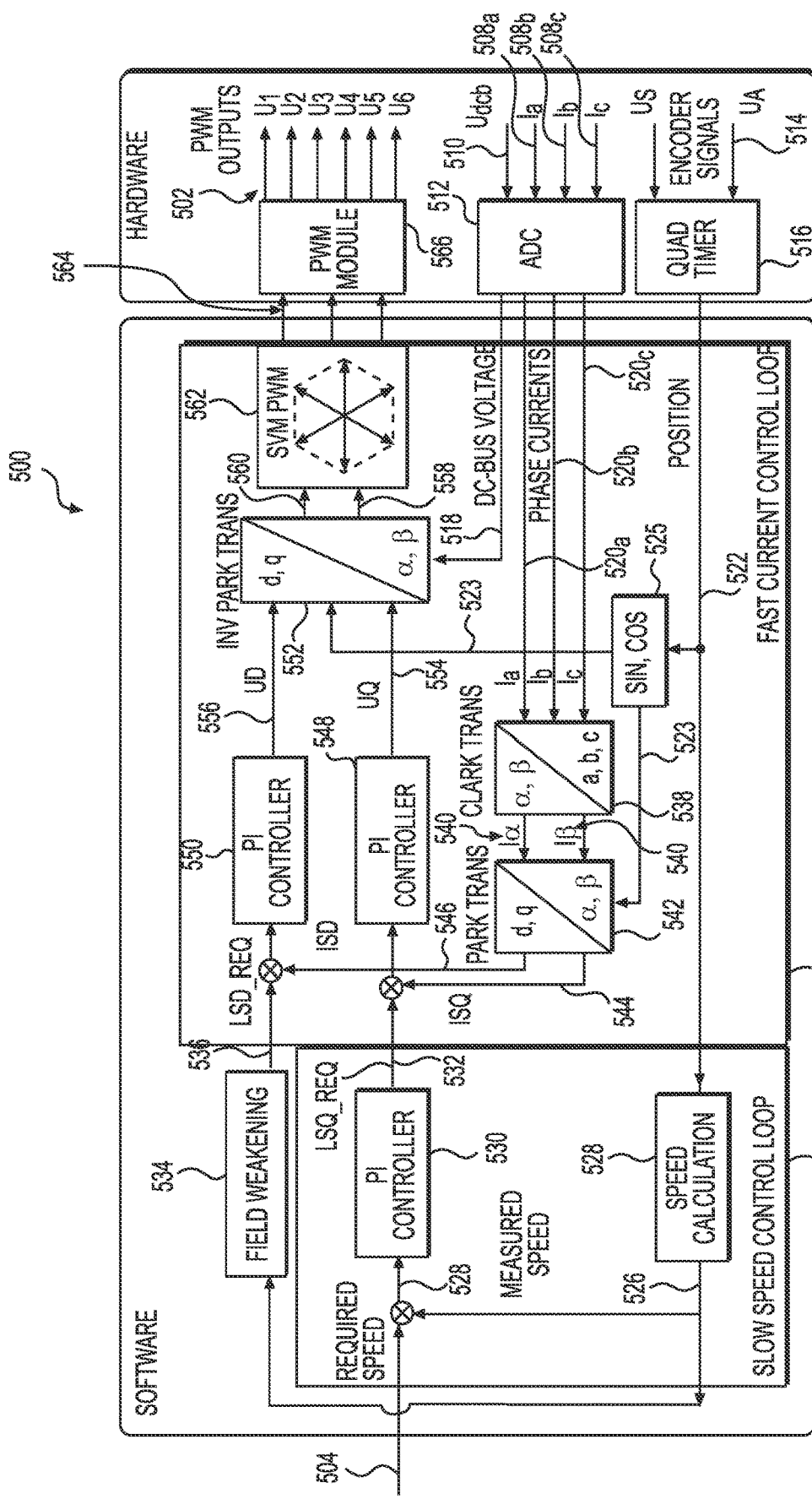
FIG. 13 is a block diagram of a typical implementation of a vector control drive.

FIG. 13 is a block diagram of a typical implementation of a vector control drive. A vector control drive 500 of FIG. 13 may be implemented at least in part in the ECU 164. An input to the vector control drive includes a set point 504 for a required speed (the speed request) that is determined as sufficient for starting the ICE 24. This set point 504 is applied to a slow speed control loop 506. Other inputs to the vector control drive 500 include current measurements $508_a$, $508_b$ and $508_c$ for the three phases of the motor-generator 144 and a voltage measurement 510 obtained from the inverter 146 and/or from the motor-generator 144. These current and voltage measurements are applied to an analog to digital converter (ADC) 512. Crankshaft angular position measurements (encoder signals $u_A$, $u_S$) 514 are applied to a quadrature timer 516. The quadrature timer 516 calculates an actual position of the crankshaft 100. The ADC 512 calculates a digitized voltage value 518 and digitized current values $520_a$, $520_b$ and $520_c$ for the three phases of the motor-generator 144. These digitized values and an actual position 522 of the crankshaft 100 calculated by the quadrature timer 516 are provided to a fast current control loop 524. The actual position 522 of the crankshaft 100 is converted to an actual (measured) speed 526 by a speed calculator 528 of the slow speed control loop 506. A difference 528 between the measured speed 526 and the required speed set point 504 is applied to a first proportional-integral (PI) controller 530 that in turn yields a current-image 532 of a torque request that is applied as a set point (Isq_req) to the fast current control loop 524.

As expressed hereinabove, in some variants, it may be desired to operate the motor-generator 144 so that it delivers electric power to the capacitance 145 in the first control strategy, at least at low revolution speeds of the crankshaft 100. To this end, an optional field weakening module 534 having an internal map attenuates values of its output based on the measured speed 526 of the crankshaft 100 to provide a current-image 536 of a magnetic field of the motor-generator 144 as an additional set point (Isd_req) applied to the fast current control loop 524.

In the fast current control loop 524, a Clark Transform 538 converts the three-phase current measurements $520_a$, $520_b$ and $520_c$ into a two-phase model 540. A Park Transform 542 fed with sine and cosine values 523 of the actual position 522 of the crankshaft 100, calculated by a sin/cos converter 525, converts further this model 540 to provide a stationary current-image 544 of the actual torque on the motor-generator 144 (Isq) and a stationary current-image 546 of the actual magnetic field of the motor-generator (Isd). Outputs 544 and 546 of this model are respectively compared to the Isq_req set point 532 and to the Isd_req set point 536 (if used), and their differences are respectively applied to second and third PI controllers 548, 550. An Inverse Park Transform 552 is applied to stationary voltage requests Uq 554 and Ud 556 produced by the second and third PI controllers 548, 550, the Inverse Park Transform 552 using the sine and cosine values 523 of the actual position 522 of the crankshaft 100 to produce outputs 558, 560 of the Inverse Park Transform 552 that are applied to a space vector modulation-pulse width modulation (SV-PWM) transform 562. In turn, the SV-PWM transform 562 provides three-phase control 564 to a PWM module 566 that generates pulses 502 that the ECU 164 provides for application to the gates G1-G6 of the inverter 146.

The ECU 164 may control a delivery of electric power from the capacitance 145 to the motor-generator 144 based on a pre-determined amount of torque, or torque request, sufficient to cause rotation of the crankshaft 100 for starting the ICE 24. However, considering that the amount of torque required to rotate the crankshaft 100 before ignition of the cylinder (or cylinders) varies based on the angular position of the crankshaft 100 in relation to the top dead center (TDC) position of each piston, calculation of a variable torque request is also contemplated. In a variant, the angular position of the crankshaft 100 is provided by the crankshaft position sensor 170 or, alternatively, by a relative position sensor. When using the relative position sensor, at each operational sequence of the ECU 164, prior to initiating rotation of the crankshaft 100, the ECU 164 magnetizes two out of the three phases of the alternating current motor-generator 144, moving and then locking the rotor of the motor-generator 144 and thereby locking the crankshaft 100, which is attached thereto, in a known repetitive electric angle. From there, rotating positions of the crankshaft 100 are calculated continuously from a counter of pulses received from the relative position sensor. An absolute position of the crankshaft 100 is calculated and an electric angle is derived from that calculation to perform vector control. In a particular implementation, an incremental encoder providing 1024 pulses per revolution of the crankshaft 100 is contemplated. Sensorless control of the crankshaft position is also possible, though with this solution, producing high torque at very low angular velocity of the crankshaft 100 may be rather challenging. Regardless, in a variant introduced in the foregoing description of operation 326 (FIG. 9), the ECU 164 calculates or otherwise determines the torque request based on an angular position of the crankshaft 100 provided by the crankshaft position sensor 170, values of the torque request being updated at various points of the rotation of the crankshaft 100. As a result, the torque request can be optimized so that it is sufficient to rotate the crankshaft 100 as it reaches various angular positions while using as little as possible of the energy stored in the capacitance 145. In a particular variant, the ECU 164 controls the amount of torque applied on the motor-generator 144 so that it turns at a very low speed until a given piston 116A, 116B passes its TDC for a first time. During this brief period of time, gas is slowly expelled from the combustion chamber 120A, 120B in which this given piston 116A, 116B is located. Very little energy is drawn from the capacitance 145 in this operation. Once the piston 116A, 116B has moved beyond its TDC, the crankshaft 100 has acquired at least some momentum. The ECU 164 then raises the torque request applied to the motor-generator 144 so that the crankshaft 100 rotates at a speed sufficient to allow injection of fuel in the combustion chamber 120A, 120B as the piston 116A, 116B moves towards its TDC, ignition taking place in the combustion chamber 120A, 120B as soon as the piston moves beyond its TDC. This increase of the torque request may be linear until a predetermined torque set-point is reached, so that the rotational speed of the crankshaft 100 increases smoothly.

Following starting of the ICE 24, irrespective of whether the ICE 24 was started using the manual start procedure, the assisted start procedure or the electric start procedure, the crankshaft 100 drives the motor-generator 144 at a variable rotational speed, most of the time significantly exceeding a rotational speed used in the course of any of the start procedures. Once the ICE 24 is started, operation of the motor-generator 144 switches to generator operating mode. In an implementation, the ECU 164 may determine a revolution speed of the crankshaft 100 based on successive readings provided by the crankshaft position sensor 170 and cause the motor-generator 144 to start delivering electric power to the capacitance 145 when the revolution speed of the crankshaft meets or exceeds a minimal revolution threshold. At this point or soon thereafter, the ECU 164 starts controlling the strategy switch 184 and the inverter 146 using the second control strategy. Optionally, the first control strategy may be used in generator operating mode until the voltage measurement provided by the voltage sensor 167 meets or exceeds a voltage generation threshold. The voltage generation threshold can be set slightly lower than a nominal voltage of the capacitance 145, for example.

The second control strategy uses a "shunt" technique. The output of the motor-generator 144, now generating, is used to charge the capacitance 145, to supply electrical power to the injectors 132a, 132b, to spark the spark plugs 134a, 134b, and, generally, to supply electrical power to electrical accessories of the snowmobile 10. To this end, the ECU 164 alters a position of the strategy switch 184 so that electrical power now flows from the motor-generator 144 to the capacitance 145, still through the inverter 146. The ECU 164 monitors the voltage of the capacitance 145 through measurements obtained from the voltage sensor 167. Based on these voltage measurements, the ECU 164 generates control pulses that are applied, via the strategy switch 184, to the gates G1-G6 of the transistors T1-T6 in the inverter 146. PWM is still applied by the ECU 164 to the gates G1-G6, but this time according to the second control strategy.

If an output voltage of the motor-generator 144 is above its nominal value, or above its nominal value plus a predetermined tolerance factor, the inverter 146 is controlled by the ECU 164 to reduce the voltage at which electrical power is delivered from the motor-generator 144 to the capacitance 145. To this end, in one operating dissipative voltage regulation mode, the ECU 164 may generate control pulses applied to various gates G2, G4 and G6 to effectively bypass, or "shunt", one or more of the phases of the motor-generator 144, at the same time applying no control pulse to the gates G1, G3 and G5 in order to cause the transistors T1, T3 and T5 to remain non-conductive (open circuit). For example, applying pulses to the gates G2 and G6 causes the transistors T2 and T6 to turn on and become conductive. As a result, a closed loop is formed between Phases A and C of the motor-generator 144 along with the transistors T2 and T6. Under this condition, no electrical power is delivered from two (2) of the phases of the motor-generator 144 to the capacitance 145. A duration (width) and timing of the pulses applied to the gates G2 and G6 impacts a duration of time when Phases A and C are shunted, in turn impacting the charging voltage applied at the capacitance 145. PWM can be applied to any pair of the bottom transistors T2, T4 and T6, so that they can be shorted at a desired time to shunt a pair of phases of the motor-generator 144. The ECU 164 may actually modify, over time, a determination of which pair of transistors is made part of a shunt in order to avoid their overheating due to conduction losses in the inverter 146. To this end, voltage regulation in shunt mode involves successively activating the transistors T2, T4 and T6. As a result, the delivery of electric power from the motor-generator 144 to the capacitance 145 can be made at a desired voltage over a broad range of the rotational speed of the crankshaft 100. A series voltage regulation mode is also contemplated, in which the freewheel diodes D1, D3 and D5 may optionally be replaced by additional transistors (not shown) mounted in reverse-parallel with the transistors T1, T3 and T5, these additional transistors being turned on and off as required to allow current from the motor-generator 144 to recharge the capacitance 145 while not exceeding the nominal voltage value.

In a particular implementation, voltage regulation in shunt mode may benefit from the measurements provided by the position sensor 170. In this implementation, the position sensor 170 allows the ECU 164 to determine a mechanical position of the crankshaft 100. The ECU 164 calculates an equivalent electrical angle by multiplying the mechanical position of the crankshaft 100 by a known number of pole pairs of the motor-generator 144. If the output voltage of the motor-generator 144 is above a predetermined value, starting from a voltage rise of any one of the phases A, B or C, all three (3) phases are consecutively shunted once, in synchrony with the operation of the motor-generator 144. This shunting sequence may be repeated when the output voltage of the motor-generator 144 rises again above the predetermined value.

If the voltage of the capacitance 145 is at or below its nominal value, the inverter 146 is controlled by the ECU 164 to deliver electrical power available from the motor-generator 144 to the capacitance 145 without shunting any of the Phases A, B or C. Under this condition, which may for example occur for a brief duration after the start of the ICE 24, the control of the power delivery could be construed as a neutral control mode distinct from the first and second control strategies. In the neutral control mode, the inverter 146 acts as a three-phase full-wave diode bridge rectifier, providing no voltage or current regulation.

Figure 14:
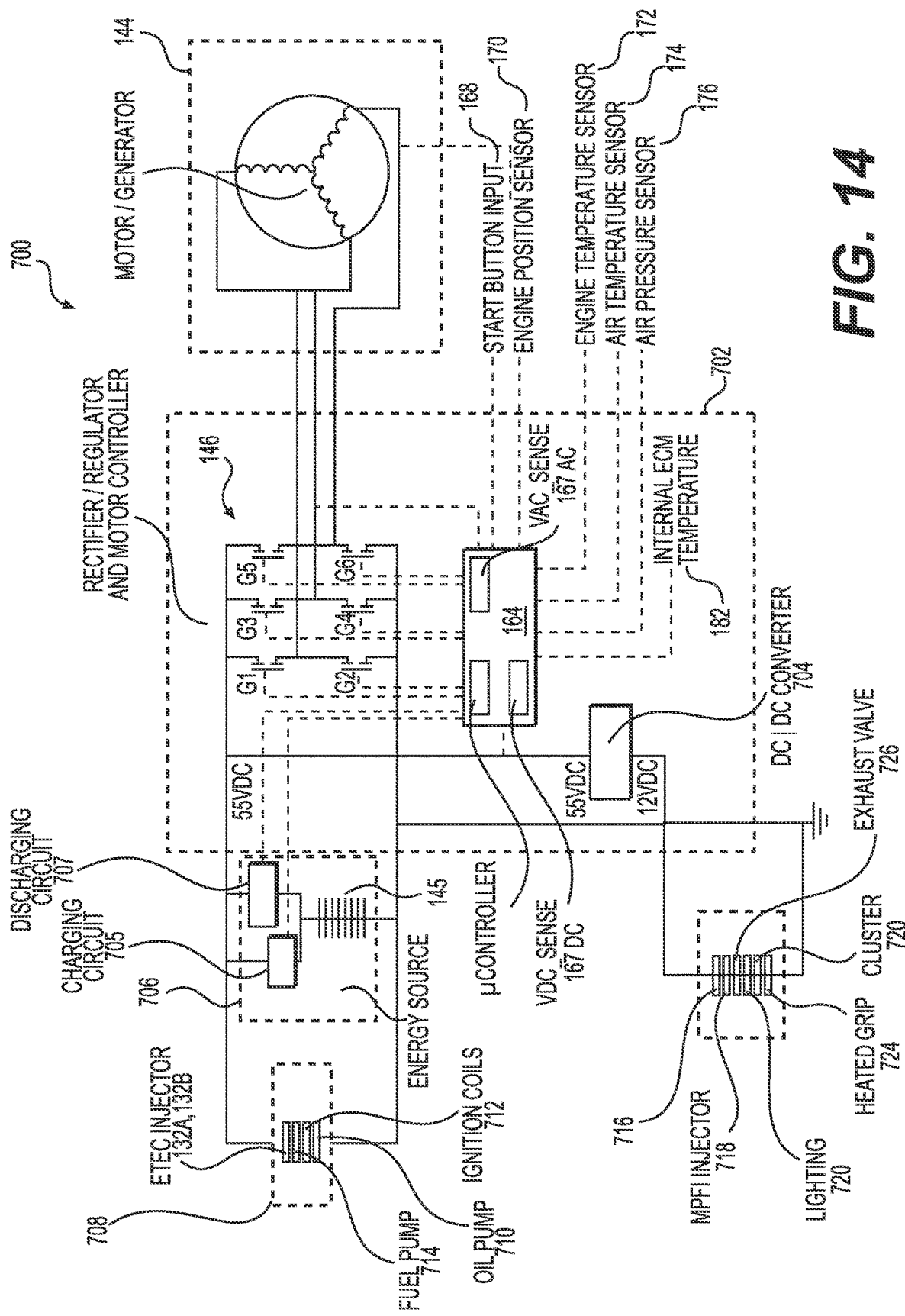
FIG. 14 is a block diagram of an electric system according to an implementation of the present technology.

FIG. 14 is a block diagram of an electric system according to an implementation of the present technology. A circuit 700 includes variants of elements introduced in the foregoing description of the various drawings, these elements being grouped into subsystems. The motor-generator 144 is one such subsystem. Another subsystem is in the form of a control module 702 that, in an implementation, comprises a single physical module including a processor 703 programmed to execute the functions of the ECU 164, the inverter 146, the ECU temperature sensor 182 and further includes a DC-DC converter 704. As shown, the ECU 164 includes connections for the electric start switch 168, for the measurements provided by the various sensors 170, 172, 174, 176 and 182, and connections to the gates G1-G6 of the inverter 146. In the illustrated example, the voltage sensor 167 is implemented as a DC voltage sensor $167_{DC}$ that measures a voltage of the capacitance 145 and as an AC voltage sensor $167_{AC}$ that measures a voltage on one phase of the motor-generator 144, these two components of the voltage sensor 167 being integrated within the ECU 164. Use of external voltage sensors operatively connected to the ECU 164 is also contemplated. A third subsystem 706 includes the capacitance 145, as well as a charging circuit 705 and a discharging circuit 707 that use the driver 216 and the transistor Q1 of FIG. 8 to control charging and discharging of the capacitance 145.

The circuit 700 operates at a nominal system voltage, which is typically the voltage of the capacitance 145 when fully charged. A fourth subsystem 708 includes components of the snowmobile 10 that operate at the system voltage. These components may include the fuel injectors 132a, 132b, an electric oil pump 710, ignition coils 712 for the spark plugs 134a, 134b and a fuel pump 714. A fifth subsystem 716 includes accessories of the snowmobile 10 that operate at an accessory voltage. These accessories may include a multi-port fuel injector (MPFI) 718, lighting 720, an instrument cluster 722 including the display 186, heated grips 724 mounted on the handlebar 36 and an exhaust valve 726. The DC-DC convertor 704 converts the system voltage to the accessory voltage and thus provides electric power to the accessories.

In an implementation, the circuit 700 normally operates at a system voltage of 55 volts and some accessories of the snowmobile normally operate at an accessory voltage of 12 volts. In this implementation, the DC-DC converter 704 is a 55V-12V converter. These values for the system voltage and for the accessory voltage are nominal for this implementation and may vary according to the actual operating conditions of the snowmobile 10.

Figure 15:
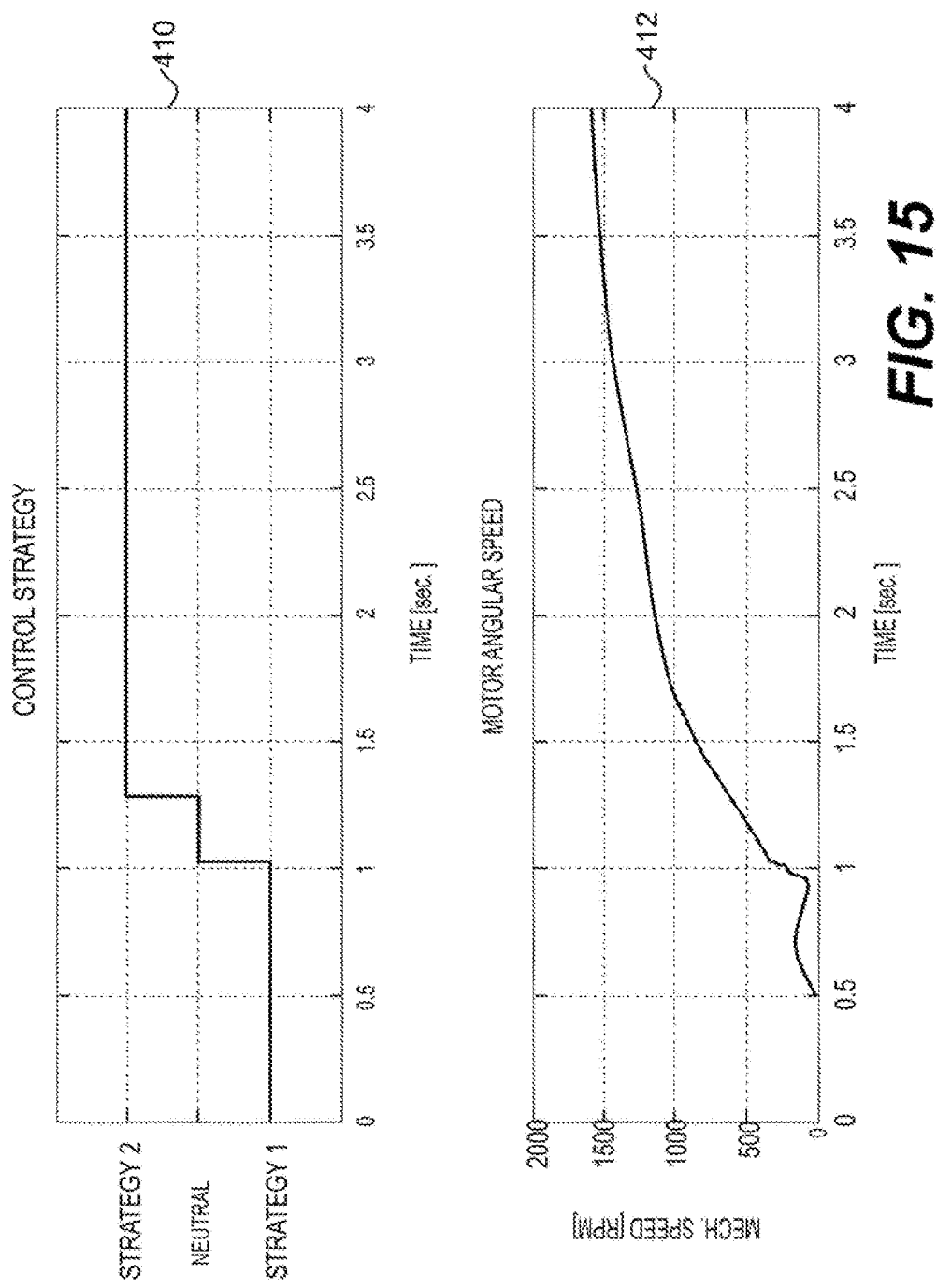
FIG. 15 is a timing diagram showing an example of a sequence for changing the control strategy for the delivery of electric power between the capacitance and the electric turning machine (ETM) along with corresponding engine rotational speed variations.

FIG. 15 is a timing diagram showing an example of a sequence for changing the control strategy for the delivery of electric power between the capacitance 145 and the motor-generator 144 along with corresponding engine rotational speed variations. A graph 410 shows a variation of electrical power delivery control strategies applied by the ECU 164, as a function of time, in seconds. In this graph 410, "Strategy 1" indicates the application of the first control strategy, specifically using a vector control, "Strategy 2" indicates the application of the second control strategy, which uses shunting of phases of the motor-generator 144 to control the voltage applied to charge the capacitance 145, and "Neutral" indicates the application of the neutral control mode. In the neutral control mode, the voltage generated by the motor-generator 144 may simply be converted to direct current and applied to charge the capacitance 145, provided that a peak back electromotive force voltage of the motor-generator 144 is higher than the nominal voltage of the circuit 200, a condition that is usually met when the ICE 24 reaches a sufficient revolution speed. A graph 412 shows a corresponding variation of a rotational speed of the crankshaft 100 over a same time scale. In a first half-second of operation following the user command for the electric start procedure for the ICE 24, no power is delivered between the capacitance 145 and the motor-generator 144. This period is used to equalize the voltages of the capacitance 145 and of the capacitor C1. The actual duration of this period may vary considerably as a function of the value of the capacitor C1. A period ranging from 0.5 to about 1.1 seconds corresponds essentially to the period covered between 0 and 0.4 seconds on the graphs 400 and 402. The ECU 164 uses the first control strategy (Strategy 1) to control delivery of electric power from the capacitance 145 to the motor-generator 144 until the ICE 24 is actually started. Then, between 1.1 and 1.3 seconds, as the ICE 24 accelerates, electric power is delivered from the motor-generator 144 to the capacitance 145 in the neutral control mode. When the crankshaft 100 reaches a sufficient rotational speed, at about 1.3 seconds, the motor-generator 144 starts generating power at a voltage that tends to exceed the nominal voltage of the capacitance 145. This is when the ECU 164 starts using the second control strategy (Strategy 2) to control delivery of electrical power from the motor-generator 144 to the capacitance 145. A variant in which the neutral control mode is not implemented is also contemplated, in which the ECU 164 starts using the second control strategy as soon as the ICE 24 is successfully started.

Figure 16:
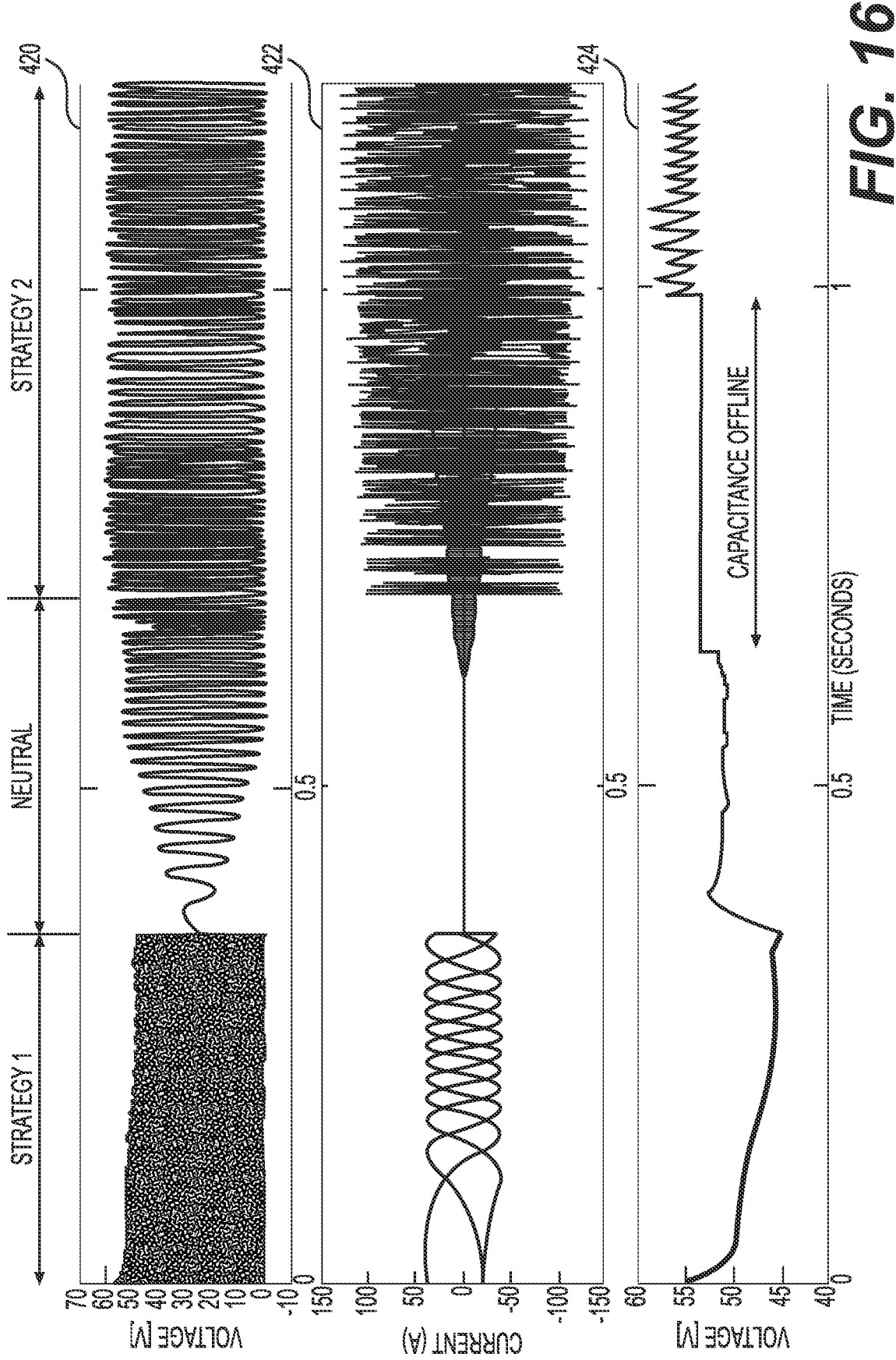
FIG. 16 is another timing diagram showing an example of an impact of the control strategies on a current exchanged between the capacitance and the ETM and on a system voltage.

FIG. 16 is another timing diagram showing an example of an impact of the control strategies on a current exchanged between the capacitance and the ETM and on a system voltage. A graph 420 shows a voltage of one of the Phases A, B or C of the motor-generator 144 as a function of time, in seconds, and as a function of the control strategies. In the first control strategy, the ECU 164 controls the application of voltage pulses to the motor-generator 144 in pulse width modulation (PWM) mode, at a very rapid rate typically expressed in kilohertz. Then, as ignition of the ICE 24 beings, in the neutral control mode, the motor-generator 144 starts generating voltage on its own, this voltage increasing until the mode changes to the second control strategy, the voltage cycling at a rate that follows the rotation of the crankshaft 100. It may be observed that because of the configuration of the inverter 146, the voltage on each phase of the motor-generator alternates between zero (0) volt and the nominal system voltage without cycling through negative values. A graph 422 shows a variation of a current flowing between the capacitance 145 and the motor-generator 144 as the ECU 164 changes from the first control strategy to the neutral control mode to the second control strategy. Initially, in the first control strategy, a three-phase current flows from the capacitance 145 toward the motor-generator 144, through the inverter 146. For most of the neutral control strategy, all transistors T1-T6 of the inverter are open and no current flows between the capacitance 145 and the motor-generator 144. Significant current is generated by each phase of the motor-generator 144 after the start of the ICE 24. The ECU 164 applies shunting of the phases of the motor-generator 144 for preventing excess voltage at its output, as illustrated by the strong variations of the current in the right-hand part of graph 422. The graph 424 shows an actual voltage measured on the capacitance 145 as the ECU 164 changes from the first control strategy to the neutral control mode to the second control strategy. The voltage of the capacitance 145 initially decreases while electric power is delivered to the motor-generator 144. Following ignition of the ICE 24, the ECU 164 places the system in neutral control mode. A discharge of the freewheel diodes D1-D6 causes a modest increase of the voltage of the capacitance 145. Opening of the transistor Q1 at the beginning of the operation in the second control strategy temporary isolates the capacitance 145 from the motor-generator 144 so that electric power produced by the motor-generator 144 is mainly available for other needs of the system, such as injection, ignition, control, and the like. Closing again of the transistor Q1 allows charging of the capacitance 145, with a voltage that oscillates near the nominal system voltage according to the shunting of the motor-generator 144.

The timing values, rotational speed values, and torque values illustrated in the various graphs 400, 402, 410, 412, 420, 422 and 424 are provided for illustration and do not limit the present disclosure. Actual values may depend greatly on the construction of the ICE 24, of the motor-generator 144, of the capacitance 145 and on the operation strategy of the ECU 164.

Modifications and improvements to the above-described implementations of the present technology may become apparent to those skilled in the art. For example, it is contemplated that the ICE 24 could be provided with a decompression system. The decompression system can release pressure in the combustion chambers 120A, 120B, thereby reducing compression forces that need to be overcome by the motor-generator 144 at operations 326 and 626 described above. Therefore, by providing a decompression system, it is contemplated that the motor-generator 144 could be even smaller and lighter, a size and a weight of the capacitance 145 being reduced accordingly. The foregoing description is intended to be exemplary rather than limiting. The scope of the present technology is therefore intended to be limited solely by the scope of the appended claims.

What is claimed is:

1. A method for operating an electric turning machine (ETM) operatively connected to an internal combustion engine, the method comprising:
   operating the ETM as a motor with a first control strategy to increase a rotational speed of the internal combustion engine,
   operating with the first control strategy comprising delivering electric power from a power source to the ETM selectively through at least one transistor of an electrical converter;
   switching from the first control strategy to a second control strategy, the second control strategy being distinct from the first control strategy; and
   in response to switching from the first control strategy to the second control strategy, operating the ETM as a generator with the second control strategy,
   operating with the second control strategy comprising delivering electric power from the ETM to an accessory selectively through the at least one transistor of the electrical converter.

2. The method of claim 1, further comprising switching from the first control strategy to the second control strategy in response to a voltage of the ETM being equal to or above a voltage generation threshold.

3. The method of claim 1, further comprising switching from the first control strategy to the second control strategy in response to the ETM operating with the first control strategy for at least a minimum time duration.

4. The method of claim 1, further comprising operating the ETM as the generator in the first control strategy before switching from the first control strategy to the second control strategy.

5. The method of claim 1, wherein the ETM operates as a starter for the internal combustion engine while controlling the ETM with the first control strategy.

6. The method of claim 1, wherein pulse-width modulation (PWM) is used to control the electrical converter connected between the ETM and the power source, the first control strategy including first calculations to determine first widths and first timings of pulses delivered to the electrical converter, the second control strategy including second calculations different from the first calculations to determine second widths and second timings of pulses delivered to the electrical converter.

7. The method of claim 1, wherein the first control strategy comprises a vector control, the vector control comprising:
   controlling a delivery of electric power from the power source to the ETM based on a pre-determined torque request sufficient to cause rotation of a crankshaft of the internal combustion engine.

8. The method of claim 1, wherein the first control strategy comprises a vector control, the vector control comprising:
   determining a speed request sufficient to start the internal combustion engine; and controlling a delivery of electric power from the power source to the ETM based on the determined speed request.

9. The method of claim 1, wherein operating the ETM as the generator comprises shunting an output of the ETM in response to the ETM generating a voltage that exceeds a maximum voltage threshold.

10. The method of claim 1, wherein operating with the second control strategy comprises delivering electric power from the ETM to the accessory at a desired voltage over a range of rotational speeds of the internal combustion engine, the range of rotational speeds being greater than a minimum revolution threshold corresponding to a successful start of the internal combustion engine.

11. The method of claim 1, wherein the power source is selected from a battery and a capacitance.

12. The method of claim 1, wherein:
the accessory is the power source; and
operating under the second control strategy comprises operating the ETM as the generator to charge the power source.

13. The method of claim 12, further comprising delivering electric power to the ETM using the first control strategy in response to sensing a command to start the internal combustion engine.

14. The method of claim 13, wherein electric power is delivered using the first control strategy in response to a voltage of the power source being equal to or above a first minimum voltage threshold.

15. The method of claim 14, further comprising:
terminating the delivery of electric power in response to the voltage of the power source falling below a second minimum voltage threshold lower than the first minimum voltage threshold; and
providing a manual start indication in response to terminating the delivery of electric power.

16. The method of claim 1, further comprising:
sensing a command to start the internal combustion engine; and
in response to sensing the command to start the internal combustion engine, providing a manual start indication in response to a voltage of the power source being below a first minimum voltage threshold.

17. The method of claim 1, wherein the internal combustion engine comprises:
a cylinder;
a cylinder head connected to the cylinder;
a piston disposed in the cylinder, the cylinder, the cylinder head and the piston defining a variable volume combustion chamber therebetween; and
a crankshaft operatively connected to the piston;
wherein the ETM is operatively connected to the crankshaft.

18. The method of claim 17, further comprising:
delivering fuel in the combustion chamber as the piston moves toward its top dead center (TDC) position and igniting the fuel in the combustion chamber as the piston moves beyond its TDC position;
wherein delivering the fuel in the combustion chamber comprises injecting the fuel in the combustion chamber.

19. The method of claim 1, further comprising determining the rotational speed of the internal combustion engine.

* * * * *